(12) United States Patent
Shin

(10) Patent No.: US 9,148,321 B2
(45) Date of Patent: Sep. 29, 2015

(54) INTERFACE CIRCUIT, INTERFACE SYSTEM AND METHOD OF INTERFACING SIGNALS TRANSFERRED BETWEEN DEVICES

(71) Applicant: Hyun-Sung Shin, Seoul (KR)

(72) Inventor: Hyun-Sung Shin, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 177 days.

(21) Appl. No.: 13/726,870

(22) Filed: Dec. 26, 2012

(65) Prior Publication Data

US 2013/0329754 A1    Dec. 12, 2013

(30) Foreign Application Priority Data

Jun. 7, 2012  (KR) .................. 10-2012-0060777

(51) Int. Cl.
*H04L 25/14* (2006.01)
*H04N 21/434* (2011.01)

(52) U.S. Cl.
CPC ............ *H04L 25/14* (2013.01); *H04N 21/4341* (2013.01)

(58) Field of Classification Search
CPC .................... H04N 21/4341; H04Q 2213/036; H04Q 2213/13036
USPC .............................. 370/476, 395.64, 536, 535
See application file for complete search history.

(56) References Cited

U.S. PATENT DOCUMENTS

| | | |
|---|---|---|
| 2002/0089714 A1 | 7/2002 | Shimoyama |
| 2011/0103404 A1* | 5/2011 | Bafra et al. .................. 370/476 |
| 2011/0116795 A1 | 5/2011 | Park et al. |

FOREIGN PATENT DOCUMENTS

KR   10-2011-0053535 A    5/2011

* cited by examiner

*Primary Examiner* — Dady Chery
(74) *Attorney, Agent, or Firm* — Muir Patent Law PLLC

(57) ABSTRACT

An interface circuit includes a deserializer and a frame detection circuit. The deserializer includes a serial input terminal for receiving a serial signal, the serial signal including a frame start code; and a plurality of first output terminals for outputting a plurality of parallel signals based on the received serial signal, one of the plurality of parallel signals being a frame signal including the frame start code. The frame detection circuit is configured to detect the frame signal at one of the output terminals of the plurality of first output terminals.

27 Claims, 24 Drawing Sheets

| MI1 | MI2 | MI3 | MI4 | MI5 | MI6 | MI7 | MI8 | MI9 |
|-----|-----|-----|-----|-----|-----|-----|-----|-----|
| D8 | F1 | D1 | D2 | D3 | D4 | D5 | D6 | D7 |
| D8 | F2 | D1 | D2 | D3 | D4 | D5 | D6 | D7 |
| ⋮ | ⋮ | ⋮ | ⋮ | ⋮ | ⋮ | ⋮ | ⋮ | ⋮ |
| Dk-2 | Fn | D1 | D2 | D3 | D4 | D5 | D6 | D7 |

| M01 | M02 | M03 | M04 | M05 | M06 | M07 | M08 | M09 |
|-----|-----|-----|-----|-----|-----|-----|-----|-----|
| F1  | D1  | D2  | D3  | D4  | D5  | D6  | D7  | D8  |
| F2  | D1  | D2  | D3  | D4  | D5  | D6  | D7  | D8  |
| ⋮   | ⋮   | ⋮   | ⋮   | ⋮   | ⋮   | ⋮   | ⋮   | ⋮   |
| Fn  | D1  | D2  | D3  | D4  | D5  | D6  | D7  | D8  |

| MCON | MC1 | MC2 | MC3 | MC4 | MC5 | MC6 | MC7 | MC8 | MC9 |
|---|---|---|---|---|---|---|---|---|---|
| BINARY | 0111 | 1000 | 0000 | 0001 | 0010 | 0011 | 0100 | 0101 | 0110 |
| MUX TERMINAL NUMBER | 7 | 8 | 0 | 1 | 2 | 3 | 4 | 5 | 6 |

| M01 | M02 | M03 | M04 | M05 | M06 | M07 | M08 | M09 |
|-----|-----|-----|-----|-----|-----|-----|-----|-----|
| F1  | D1  | D2  | D3  | D4  | D5  | D6  | D7  | D8  |
| F2  | D1  | D2  | D3  | D4  | D5  | D6  | D7  | D8  |
| ⋮   | ⋮   | ⋮   | ⋮   | ⋮   | ⋮   | ⋮   | ⋮   | ⋮   |
| Fn  | D1  | D2  | D3  | D4  | D5  | D6  | D7  | D8  |
| C1  | D1  | D2  | D3  | D4  | D5  | D6  | D7  | D8  |
| C2  | D1  | D2  | D3  | D4  | D5  | D6  | D7  | D8  |
| ⋮   | ⋮   | ⋮   | ⋮   | ⋮   | ⋮   | ⋮   | ⋮   | ⋮   |
| Cm  | D1  | D2  | D3  | D4  | D5  | D6  | D7  | D8  |

↑
BT

INTERFACE CIRCUIT, INTERFACE SYSTEM AND METHOD OF INTERFACING SIGNALS TRANSFERRED BETWEEN DEVICES

CROSS-REFERENCE TO RELATED APPLICATION

This application claims priority under 35 USC §119 to Korean Patent Application No. 10-2012-0060777, filed Jun. 7, 2012, in the Korean Intellectual Property Office (KIPO), the contents of which are herein incorporated by reference in their entirety.

BACKGROUND

Example embodiments relate generally to signal transfer, and more particularly to interface circuits, interface systems and methods of interfacing signals transferred between devices having parallel interfaces.

According to development of semiconductor technology, various electronic devices, such as an application processor device, a memory device, a display device, etc., are being developed to have smaller size, higher performance and higher speed. Signal transfer between the devices of higher performance needs to be performed with higher speed through a reduced number of transmission lines.

In response to such demands, serial communication may be adopted such that a plurality of parallel signals are serialized by a transmitting device, and the serialized signal is transferred through a transmission line and then the received signal is deserialized back to the plurality of parallel signals by a receiving device. Conventional serial communications require excessive information such as packet header and tail to be included in the serialized signal and complex logics for encoding and decoding of transferred serial signals, thereby increasing transfer latency and size of the communication system.

SUMMARY

Some example embodiments are directed to an interface circuit, a memory system, and certain methods.

In one embodiment, an interface circuit includes a deserializer and a frame detection circuit. The deserializer includes a serial input terminal for receiving a serial signal, the serial signal including a frame start code, and a plurality of first output terminals for outputting a plurality of parallel signals based on the received serial signal. One of the plurality of parallel signals is a frame signal including the frame start code. The frame detection circuit is configured to detect the frame signal at one of the output terminals of the plurality of first output terminals.

In another embodiment, a method includes receiving, at a deserializer, a serial signal that includes a frame code interleaved with a plurality of data bits; outputting from the deserializer a plurality of parallel signals, one of the plurality of parallel signals being a frame signal including the frame code, and the remainder of the parallel signals being parallel data signals, each parallel data signal including a set of data bits from the plurality of data bits; detecting, by a detection circuit, the frame signal; and reorganizing the plurality of parallel signals based on the detection by the detection circuit.

In a further embodiment, a method of interfacing signals includes receiving a first serial signal including a first frame signal, wherein the first frame signal includes a frame code; deserializing the received first serial signal to output a first set of first parallel signals; detecting the frame code from among the first set of first parallel signals; and reorganizing output paths for the first set of first parallel signals based on the detection result, and outputting the first set of first parallel signals over the reorganized output paths to output a first set of second parallel signals.

In yet another embodiment, a memory system, includes a serializer and an interface circuit. The serializer includes a plurality of serializer input terminals including at least a first dedicated input terminal dedicated to receiving a frame signal that includes a frame code, and a serializer output terminal configured to output serialized data including the frame code. The interface circuit includes at least an interface input terminal, a plurality of intermediate output terminals, and a plurality of interface output terminals, each of the plurality of intermediate output terminals having a data path connected to one of the plurality of interface output terminals. The interface circuit is configured to change the data paths connecting the intermediate output terminals to the interface output terminals. One of the interface output terminals is predetermined to receive the frame code received by the first dedicated input terminal.

In yet another embodiment, an apparatus, includes a first device having a first parallel interface, a second device having a second parallel interface corresponding to the first parallel interface and an interface system configured to perform a serial communication between the first and second devices. The interface system includes a transmission line, a bit stream generator, a serializer, a deserializer, a detection-control circuit and a matching block. The bit stream generator generates a frame signal including a frame code of multiple bits. The serializer serializes the frame signal and transmitting parallel signals from the second device to output a serial signal to the transmission line. The deserializer deserializes the serial signal transferred through the transmission line to output a plurality of received parallel signals. The detection-control circuit detects the frame signal among the received parallel signals to generate a matching control signal. The matching block converts output-paths of the received parallel signals based on the matching control signal to output a plurality of matched parallel signals provided to the first device.

BRIEF DESCRIPTION OF THE DRAWINGS

Illustrative, non-limiting example embodiments will be more clearly understood from the following detailed description taken in conjunction with the accompanying drawings.

FIG. 15 is a diagram illustrating exemplary matched parallel signals output through the output-paths of FIG. 14.

FIG. 18 is a diagram illustrating an example of a matching control signal provided to the match block of FIG. 17.

DETAILED DESCRIPTION OF THE EMBODIMENTS

Figure 1:
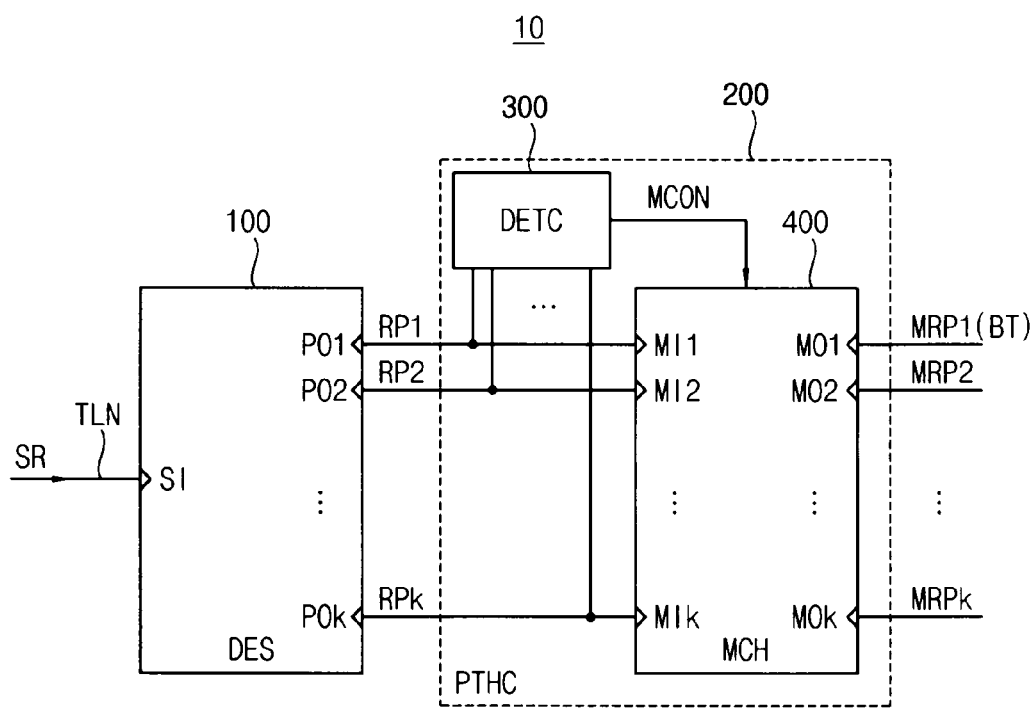
FIG. 1 is a block diagram illustrating an interface circuit according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms unless indicated otherwise. Throughout the specification, these terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "on," or "connected" or "coupled" to another element, it can be directly on, directly connected to or directly coupled to the other element or intervening elements may be present. In contrast, when an element is referred to as being "directly on," "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an interface circuit according to example embodiments.

Referring to FIG. 1, an interface circuit 10 includes a deserializer (DES) 100 and a path converter (PTHC) 200. FIG. 1 illustrates a receiving interface circuit configured to interface a received serial signal.

The deserializer 100 may include known circuitry configured to deserialize a serial signal SR transferred through a transmission line TLN to output a plurality of parallel signals RP1 through RPk. The path converter 200 receives parallel signals RP1 through RPk, and detects a frame signal BT among the received parallel signals RP1 through RPk. The frame signal BT periodically includes a frame code of multiple bits, referred to herein as frame bits. The path converter 200 is configured to convert, or reorganize, output-paths of the received parallel signals RP1 through RPk based on the detection result and to output a plurality of matched parallel signals MRP1 through MRPk corresponding to rearranged signals of the received parallel signals RP1 through RPk. As such, data paths, or output paths, within the path converter 200 may be changed or reorganized, for example, according to the exemplary embodiments discussed below.

The deserializer 100 may receive the serial signal SR through an input terminal SI coupled to the transmission line TLN. The input terminal may be referred to herein as a serial input terminal. The deserializer 100 may then sequentially sample bits in the serial signal SR using a clock signal of a frequency corresponding to a bit rate of the serial signal SR. The sampled bits are sequentially output through output terminals PO1 through POk as the parallel signals RP1 through RPk. The parallel signals output from the deserializer 100 and input to the path converter 200 may also be referred to as received parallel signals, which may be described as first parallel signals.

In one exemplary embodiment, when the number of the received parallel signals RP1 through RPk is k, the bit rate of each of the received parallel signals RP1 through RPk is 1/k of the bit rate of the serial signal SR. The deserializer 100 may perform the deserialization operation or the parallelization operation using an external clock signal and/or a restored clock signal. The deserializer 100 or the interface circuit 10 may include a clock multiplier, a clock divider and/or a clock-data recovery circuit.

As will be described with reference to FIGS. 2 through 5, the serial signal SR may include serialized sequential data. The serialized data may sequentially include the bits of a frame code FRC and one of the received parallel signals RP1 through RPk may correspond to the frame signal BT that includes the frame code FRC. The other of the received parallel signals RP1 through RPk may include data (e.g., read/write data, address data, or command data) that forms parallel data signals. The frame code FRC may be interleaved with a plurality of data bits (e.g., read/write data bits, address data bits, or command data bits) to form the serialized data. Therefore, the serialized data may include a frame code, and particularly frame bits of a single frame code, interleaved with a plurality of data bits. The path converter 200 detects the frame signal BT including the frame code FRC among the received parallel signals RP1 through RPk and converts the output paths of the received parallel signals RP1 through RPk based on the detection result.

The conversion of output-paths represents conversion of connections between input terminals and output terminals of the path converter 200, for example, by a multiplexing operation. The path converter 200 may perform frame synchronization in real time by controlling the connections between the terminals without storing the sampled bit values in a memory device, a buffer, etc. and without analyzing or decoding the stored values.

The path converter 200 may include a plurality of matching output terminals MO1 through MOk for outputting the matched parallel signals MRP1 through MRPk. For example, in one embodiment, the path converter 200 may convert the output-paths of the received parallel signals RP1 through RPk to the matching output terminals MO1 through MOk based on the detection result such that the frame signal BT is output through a first terminal MO1 of the matching output terminals and the rest of the signals of the received parallel signals RP1 through RPk are output sequentially through the rest of the terminals MO2 through MOk of the matching output terminals. However, the frame signal BT may be output at a different one of the output terminals MO1 through MOk. In one embodiment, regardless of the order of the signals received at the path converter 200, the path converter 200 is configured such that the received signals are reorganized so that the frame signal BT is always output by a predetermined output terminal from among terminals MRP1 through MRPk. The output terminals PO1 through POk discussed above may also be referred to herein as first output terminals, intermediate terminals, or intermediate output terminals. The output terminals MO1 through MOk may also be referred to herein as second output terminals, or interface output terminals.

As illustrated in FIG. 1, the path converter 200 may include a detection-control circuit (DETC) 300 and a matching block (MCH) 400.

The detection-control circuit 300 detects the frame signal BT among the received parallel signals RP1 through RPk to generate a matching control signal MCON representing the detection result. The matching block 400 may include a plurality of matching input terminals MI1 through MIk for receiving the parallel signals RP1 through RPk and a plurality of matching output terminals MO1 through MOk for outputting the matched parallel signals MRP1 through MRPk. The matching block 400 may match input terminals to output terminals, for example, by controlling connections between the matching input terminals MI1 through MIk and the matching output terminals MO1 through MOk in response to the matching control signal MCON. Configuration and operation of the detection-control circuit 300 and the matching block 400 will be further described with reference to FIGS. 2 through 9 and FIGS. 12 through 18.

As such, the interface circuit 10 according to example embodiments may perform the synchronization of the outputting order of the matched parallel signals MRP1 through MRPk. As a result, frame synchronization may be performed through the prompt multiplexing operation without storing and decoding the received signal.

Figure 2:
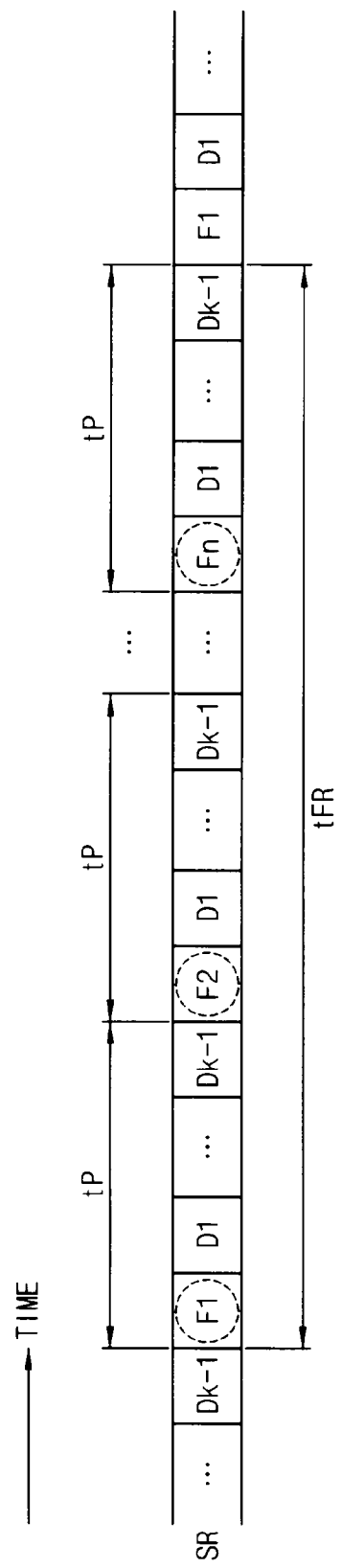
FIG. 2 is a diagram illustrating an example of a serial signal received by the interface circuit of FIG. 1.
Figure 3:
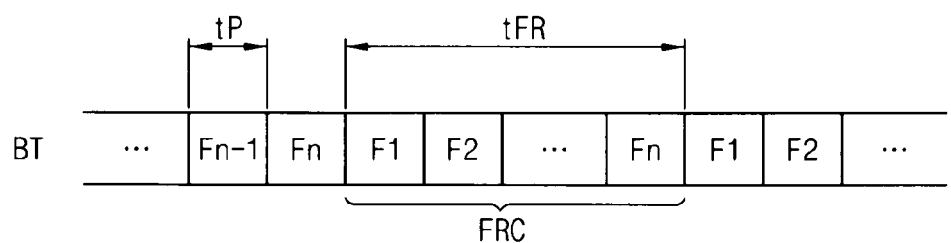
FIG. 3 is a diagram illustrating an example of a frame signal detected by a path converter in the interface circuit of FIG. 1.

FIG. 2 is a diagram illustrating an example of a serial signal received by the interface circuit of FIG. 1, and FIG. 3 is a diagram illustrating an example of a frame signal detected by a path converter in the interface circuit of FIG. 1.

Referring to FIGS. 2 and 3, the serial signal SR may be generated by serializing k transmission parallel signals including one frame signal BT and k−1 data signals to be transferred through the serial signal SR. The frame signal BT may repeatedly include the frame code FRC for the frame synchronization. The frame signal BT may include frame bits F1 through Fn forming the frame code FRC, the first data signal may include first data bits D1, the second data signal may include second data bits D2, and likewise the (k−1)-th data signal may include (k−1)-th data bits Dk−1.

For example, when the serial signal SR is generated by serializing k transmission parallel signals including one frame signal and the frame code FRC includes n frame bits F1 through Fn, n*k bits may be included in the serial signal SR per frame period tFR as illustrated in FIG. 2. One frame corresponds to the n*k bits from the first frame F1 to the (k−1)-th data bit Dk−1 just before the following first frame bit F1.

The deserializer 100 in the interface circuit 10 of FIG. 1 may sample and deserialize k bits of the serial signal SR per deserialization period tP to sequentially output the sampled bits to the output terminals PO1 through POk. The received parallel signals RP1 through RPk that are deserialized as such are sequentially output through the output terminals PO1 through POk, and thus one of the received parallel signals RP1 through RPk corresponds to the frame signal BT periodically including the frame bits F1 through Fn as illustrated in FIG. 3.

The frame signal BT is output randomly through one of the output terminals PO1 through POk because the deserializer 100 in the interface circuit 10 of FIG. 1 doesn't know a start timing point of the frame, such as the timing point of the first frame bit F1 of the frame code FRC.

When the serial signal SR is a non-return to zero (NRZ) signal, the conventional interface system needs to include a scrambler in the transmitting interface circuit and a descrambler in the receiving circuit so that the serial signal includes at least one bit of '1' within the predetermined number of sequential bits. However, according to certain embodiments, such a scheme is not necessary. For example, the above-described frame code FRC may be a bit train such as '1101011110', which are predetermined between a transmitting interface circuit and the receiving interface circuit 10. As such, both the transmitting interface and the receiving interface circuit 10 are aware of the frame code FRC in advance of data being transmitted to the receiving interface circuit 10. In this case, the serial signal SR need not include the excessive number of sequential bits of '0' and thus the scrambler and the descrambler may be omitted. Accordingly the transfer latency and the system size may be reduced using the frame bits that are interleaved into the serial signal SR. Because the frame code FRC may be used to determine a start of a received signal or frame of bits, as discussed further below, the frame code FRC may be referred to as a frame start code.

Figure 4:
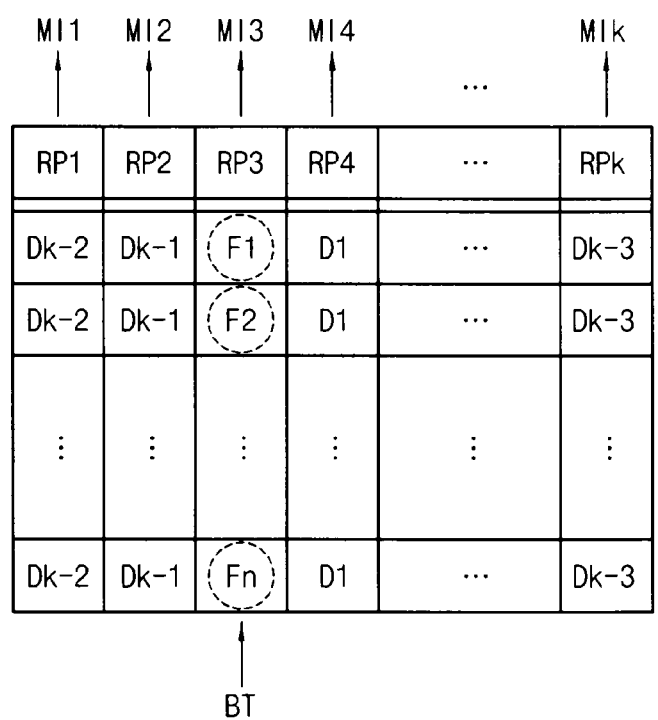
FIG. 4 is a diagram illustrating an example of received parallel signals input to a matching block in the interface circuit of FIG. 1.

FIG. 4 is a diagram illustrating an example of received parallel signals input to a matching block in the interface circuit of FIG. 1.

FIG. 4 illustrates first through k-th received parallel signals RP1 through RPk that are input to matching input terminals MI1 through MIk, respectively. For example, the frame signal BT may be output as the third received parallel signal RP3 through the third output terminal PO3 of the deserializer 100. This represents that the deserializer 100 samples the serial signal SR in synchronization with the input timing of the (k−2)-th data bit Dk−2 and outputs k bits of the serial signal SR through the first through k-th output terminals PO1 through POk, sequentially. In other words, the (k−2)-th data signal including the (k−2)-th data bits Dk−2 is output as the first received parallel signal RP1 through the first output terminal PO1, the (k−1)-th data signal including the (k−1)-th data bits Dk−1 is output as the second received parallel signal RP2 through the second output terminal PO2, the frame signal BT including the frame bits F1 through Fn is output as the third received parallel signal RP3 through the third output terminal PO3, and likewise the (k−3)-th data signal including the (k−3)-th data bits Dk−3 is output as the k-th received parallel signal RPk through the k-th output terminal POk.

As illustrated in FIG. 1, the output terminals PO1 through POk of the deserializer 100 may be one-to-one coupled directly to the input matching terminals MI1 through MIk of the matching block 400. Accordingly the (k−2)-th data signal including the (k−2)-th data bits Dk−2 is input to the first matching input terminal MI1, the (k−1)-th data signal including the (k−1)-th data bits Dk−1 is input to the second matching input terminal MI2, the frame signal BT including the frame bits F1 through Fn is input to the third matching input terminal MI3, and likewise the (k−3)-th data signal including the (k−3)-th data bits Dk−3 is input to the k-th matching input terminal MIk.

As such, that deserialization order, that is, the output order of the received parallel signals RP1 through RPk may be different from the serialization order of the signals used for generating the serial signal SR. As a result, the received parallel signals RP1 through RPk as illustrated in FIG. 4, which require the frame synchronization, may be input to the matching input terminals MI1 through MIk of the matching block 400.

Figure 5:
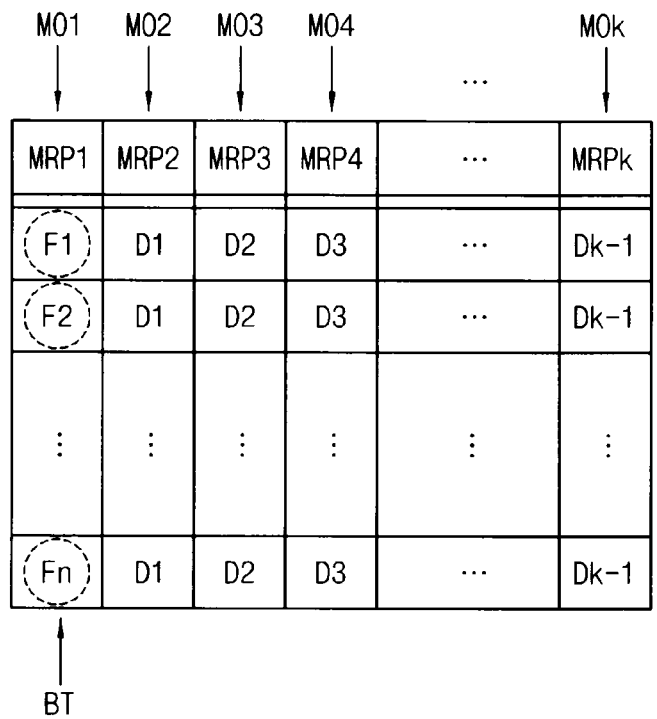
FIG. 5 is a diagram illustrating an example of matched parallel signal output from a matching block in the interface circuit of FIG. 1.

FIG. 5 is a diagram illustrating an example of matched parallel signal output from a matching block in the interface circuit of FIG. 1.

FIG. 5 illustrates first through k-th matched parallel signals MRP1 through MRPk that are output through matching output terminals MO1 through MOk, respectively. Referring to FIG. 5, the frame signal BT including the frame bits F1 through Fn is output as the first matched parallel signal MRP1 through the first matching output terminal MO1, the first data signal including the first data bits D1 is output as the second matched parallel signal MRP2 through the second matching output terminal MO2, the second data signal including the second data bits D2 is output as the third matched parallel signal MRP3 through the third matching output terminal MO3, and likewise the (k−1)-th data signal including the (k−1)-th data bits Dk−1 is output as the k-th matched parallel signal MRPk through the k-th matching output terminal MOk.

As a result, the frame synchronization may be performed by the matching block 400 such that the frame signal BT is output through the first matching output signal MO1 and the other received parallel signals except the frame signal BT, that is, the first through (k−1)-th data signals are sequentially output through the second through k-th matching output terminals MO2 through MOk.

Referring to FIGS. 4 and 5, to perform the frame synchronization, that is, the synchronization of the output order of the matching output signals MRP 1 through MRPk through the matching output terminals MO1 through MOk, the matching block 400 controls connections between the matching input terminals MI1 through MIk of receiving the received parallel signals RP1 through RPk and the matching output terminals MO1 through MOk of outputting the matched parallel signals MRP1 through MRPk. For example, if the deserializer 100 performs the deserialization operation such that the third received parallel signal RP3 corresponds to the frame signal BT, the third matching input terminal MI3 receiving the frame signal BT is connected to the first matching output terminal MO1, the fourth matching input terminal MI4 is connected to the second matching output terminal MO2, and likewise the second matching input terminal MI2 is connected to the k-th matching output terminal MOk. Such multiplexing operation of the matching block 400 may be performed based on the matching control signal MCON, which will be further described with reference to FIGS. 13 through 18. The terminals described herein with respect to an order (e.g., first, second, etc.), are shown in one embodiment at a particular location with respect to the matching block (e.g., the terminal MO1 is shown as an end terminal among terminals MO1 through MOk). In one embodiment, the terminals are conductive pins. However, the terminals may be other types of conductive connectors as well. In addition, the terminal, for example, at which the frame signal BT is output, need not be in the position depicted, but can be in other physical locations among the output pins.

Figure 6:
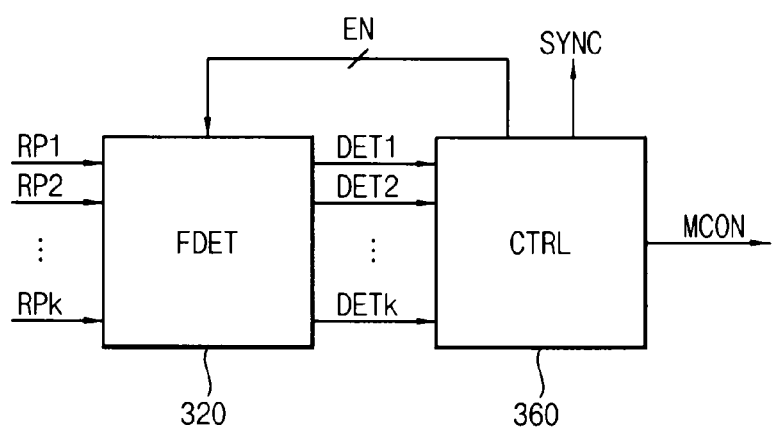
FIG. 6 is a block diagram illustrating an example of a detection-control circuit in the interface circuit of FIG. 1.

FIG. 6 is a block diagram illustrating an example of a detection-control circuit in the interface circuit of FIG. 1.

Referring to FIG. 6, a detection-control circuit 300 may include a frame detection circuit (FDET) 320 and a control circuit (CTRL) 360. The frame detection circuit 320 may include a plurality of detection units, or detection sub-circuits configured to compare the received parallel signals RP1 through RPk with the frame code FRC to output a plurality of detection signals DET1 through DETk, respectively. The control circuit may generate the matching control signal MCON based on the detection signals DET1 through DETk.

The frame detection circuit 320 may be enabled in response to an enable signal EN provided from the control circuit 360. The enable signal EN may include a plurality of signals EN1 through ENk as will be described with reference to FIG. 7. The frame detection circuit 320 may detect one signal corresponding to the frame signal BT among the plurality of received parallel signals RP1 through RPk and may activate the corresponding one of the detection signals DET1 through DETk. The first detection signal DET1 may be activated when the first received parallel signal RP1 corresponds to the frame signal BT, the second detection signal DET2 may be activated when the second received parallel signal RP2 corresponds to the frame signal BT, and likewise the k-th detection signal DETk may be activated when the k-th received parallel signal RPk corresponds to the frame signal BT. Since the frame signal BT includes the frame code FRC periodically, the one of the frame signals DET1 through DETk may be activated to include pulses periodically.

The control circuit 360 may generate, based on the detection signals DET1 through DETk, the matching control signal MCON having a value corresponding to the one activated detection signal and may provide the matching control signal MCON to the matching block 400. As such, the matching control signal MCON may have the value corresponding to the matching input terminal receiving the frame signal BT and thus the matching block 400 may control, based on the matching control signal MCON, the connections between the matching input terminals MI1 through MIk and the matching output terminals MO1 through MOk.

The control circuit 360 may generate a synchronization signal SYNC that is activated when the control circuit 360 determines that the frame synchronization is completed. For example, the control circuit 360 may determine that the frame synchronization is completed when the same detection signal is sequentially activated for several times (e.g., several consecutive times). The activated synchronization SYNC may represent the output order of the matched parallel signals MRP1 through MRPk are synchronized and thus the interface circuit 10 is ready to receive valid signals. In an example embodiment, the synchronization signal SYNC may be provided to the transmitting end to inform that the receiving end is ready to receive the valid data signals.

Figure 7:
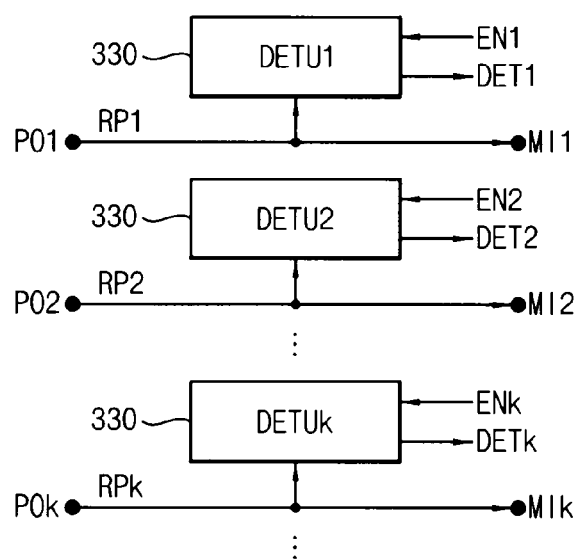
FIG. 7 is a block diagram illustrating an example of a frame detection circuit in the detection-control circuit of FIG. 6.

FIG. 7 is a block diagram illustrating an example of a frame detection circuit in the detection-control circuit of FIG. 6.

Referring to FIG. 7, a frame detection circuit 320 may include a plurality of detection units DETU1 through DETUk 330, or sub-circuits, configured to receive the received parallel signals RP1 through RPk and compare the received parallel signals RP1 through RPk with the frame code FRC to generate the detection signals DET1 through DETk, respectively. To receive the received parallel signals RP1 through RPk, the detection units DETU1 through DETUk may be coupled to nodes between the output terminals PO1 through POk of the deserializer 100 and the matching input terminals MI1 through MIk, respectively.

The enable signal EN provided from the control circuit 360 may include a plurality of signals, for example, first through k-th enable signals EN1 through ENk. The first through k-th detection units DETU1 through DETUk may be enabled selectively in response to the first through k-th enable signals EN1 through ENk, respectively. For example, the control circuit 360 may activate all of the first through k-th enable signals EN1 through ENk before the detection of the frame signal BT is completed. After the detection of the frame signal BT is completed, the control circuit 360 may deactivate the enable signals except the one enable signal that is provided to the detection unit of detecting the frame signal. As such, power consumption may be reduced by selectively disabling the unnecessary detection units after the frame synchronization is completed.

Figure 8:
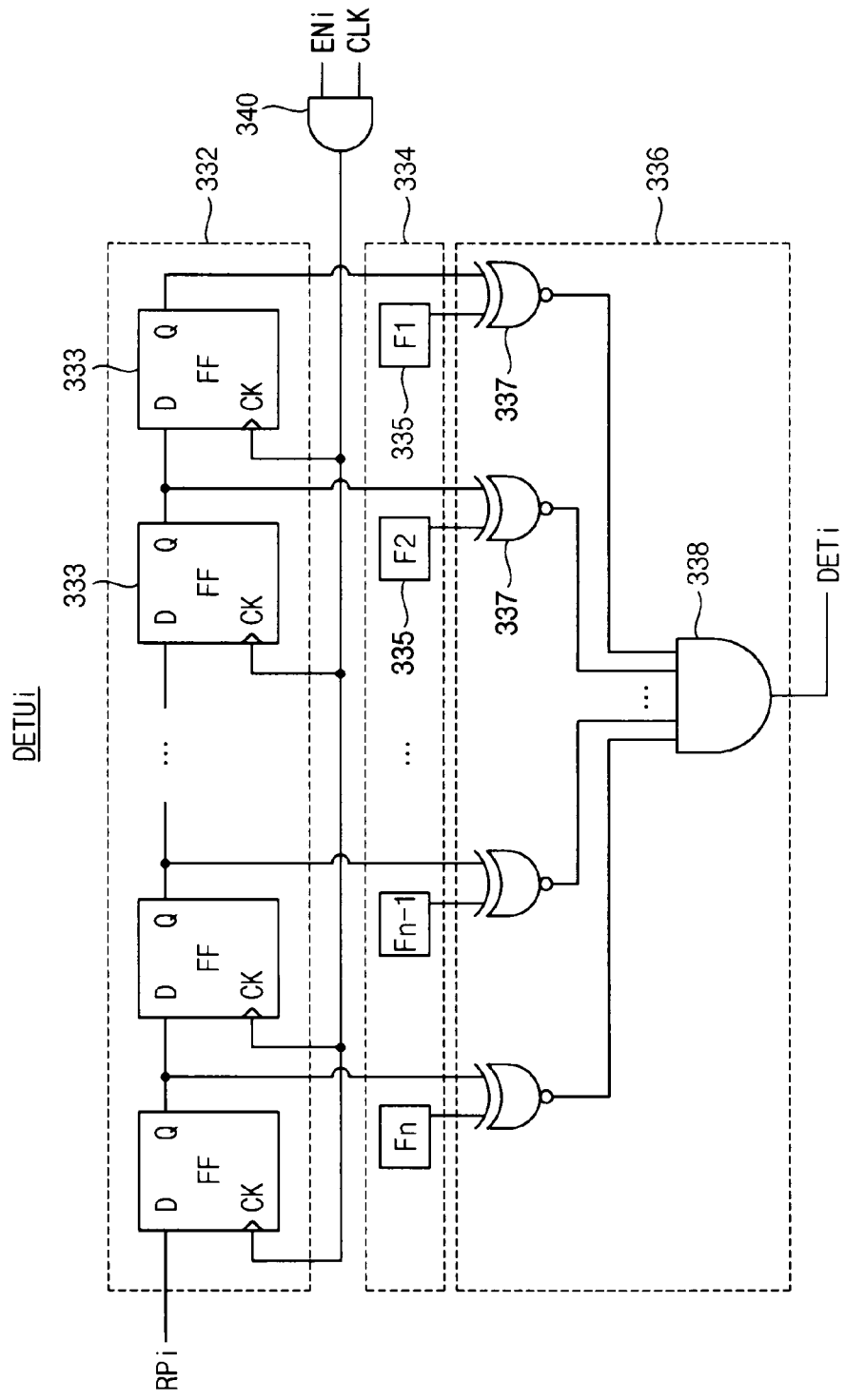
FIG. 8 is a circuit diagram illustrating an example of a detection unit in the frame detector of FIG. 7.

FIG. 8 is a circuit diagram illustrating an example of a detection unit in the frame detector of FIG. 7. The detection units DET1 through DETk may have the same configuration and thus FIG. 8 illustrates only one detection unit DETi.

Referring to FIG. 8, the detection unit DETi may include a shift register 332, a code storage 334 and a comparator 336.

The shift register 332 may include a plurality of flip-flops (FF) 333 configured to sequentially shift and store bits of each received parallel signal RPi. The code storage 334 may include a plurality of storage units 335 configured to respectively store the frame bits F1 through Fn of the frame code FRC. The comparator 336 may include logic gates 337 and 338 configured to compare outputs of the shift register 332 with outputs of the code storage 334 to generate each detection signal DETi.

The flip-flops 333 of the shift register 332 may perform the shifting operation per cycle of a clock signal CLK and sequentially store the bits of the received parallel signal RPi. In an example embodiment, the detection unit DETUi may be disabled by deactivating the clock signal CLK applied to the flip-flops 333. The detection unit DETUi may further include an AND logic gate 340 performing AND logic operation on the enable signal ENi and the clock signal CLK to output a signal applied to clock terminals CK of the flip-flops 333.

The comparator 336 may include a plurality of exclusive-NOR logic gate 337 and an AND logic gate 338. Each of the exclusive-NOR logic gates 337 performs exclusive-NOR logic operation on each output of the flip-flops 333 and each output of the storage units 335. The AND logic gate 338 performs on the outputs of the exclusive-NOR logic gates 337 to generate the detection signal DETi. As a result, the detection signal DETi may be activated, for example, to logic high level, when the bits stored in the flip-flops 333 are identical to the frame bits F1 through Fn stored in the storage units 335.

The configuration illustrated in FIG. 8 is a non-limiting example of describing the operation of the detection unit DETUi.

Figure 9:
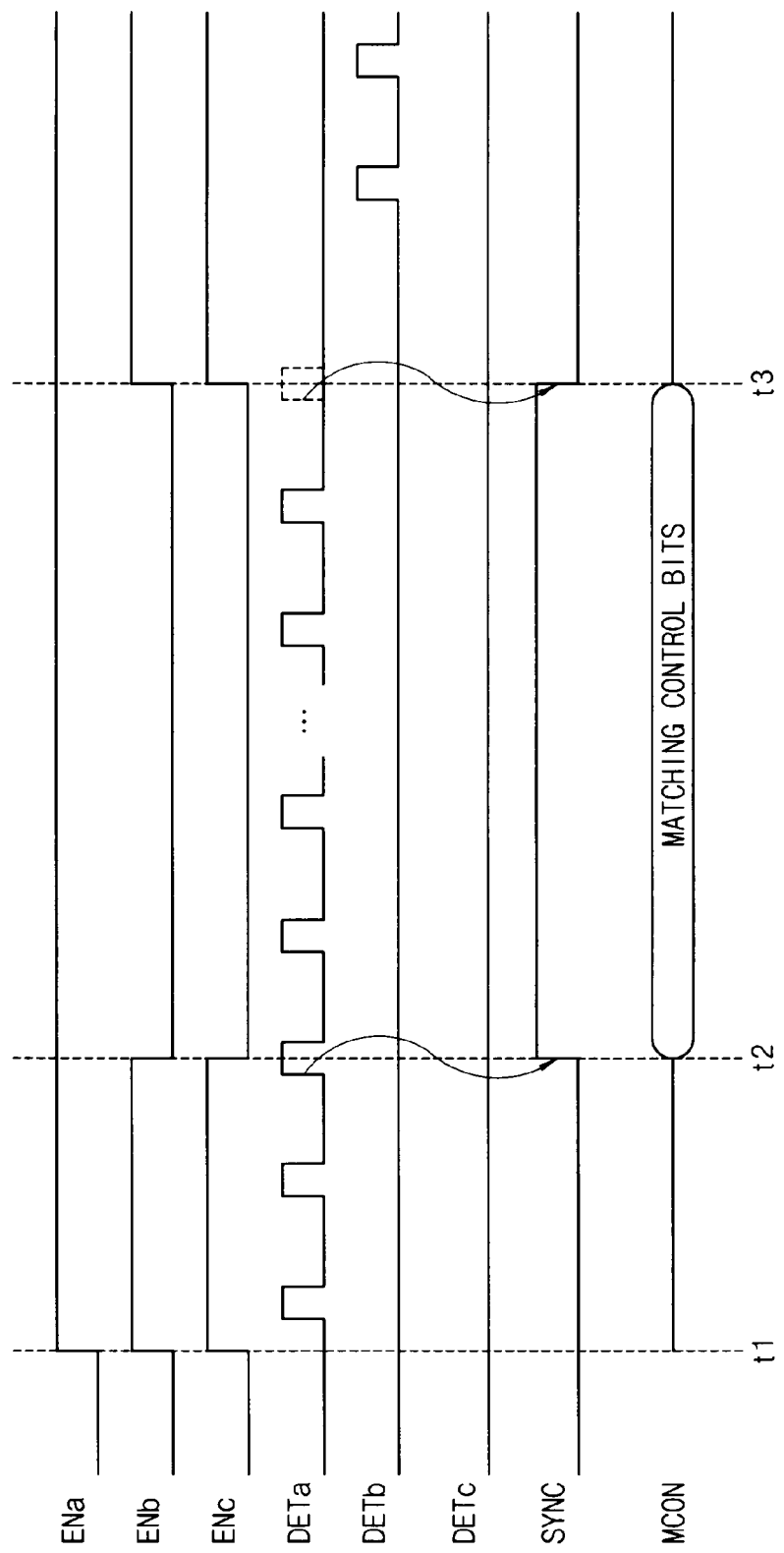
FIG. 9 is a timing diagram illustrating an example operation of the detection-control circuit of FIG. 6.

FIG. 9 is a timing diagram illustrating an example operation of the detection-control circuit of FIG. 6. For convenience of illustration and description, FIG. 9 illustrates just three enable signals ENa, ENb and ENc and three detection signals DETa, DETb and DETc corresponding to three detection units.

Referring to FIG. 9, all of the enable signals ENa, ENb and ENc may be activated during a time interval t1 to t2 before the frame synchronization is completed. As described above, the control circuit 360 may determine that the frame synchronization is completed when the same detection signal is sequentially activated for several times. For example, the control circuit 360 may determine that the frame synchronization is completed when the one detection signal DETa is continuously activated for three times as illustrated in FIG. 9 (e.g., after three consecutive activations). When the frame synchronization is completed at time t2, the control circuit 360 may activate the synchronization SYNC and set the matching control signal MCON to matching control bits corresponding to the activated detection signal DETa.

At time t2 when the frame synchronization is completed, also the control circuit 360 may deactivate the enable signals ENb and ENc except the one enable signal ENa that is provided to the detection unit of detecting the frame signal BT. As such, power consumption may be reduced by selectively disabling the unnecessary detection units after the frame synchronization is completed.

If the detection signal DETa is not activated at time t3 due to an operation error and so on, the control circuit 360 may deactivated the synchronization signal SYNC and activate all of the enable signals ENa, ENb and ENc at time t3 to resume the detection of the frame signal BT. After time t3, another detection signal DETb may be activated and the activation of the synchronization signal SYNC and the deactivation of the unnecessary enable signals may be performed according to the detection result.

Figure 10:
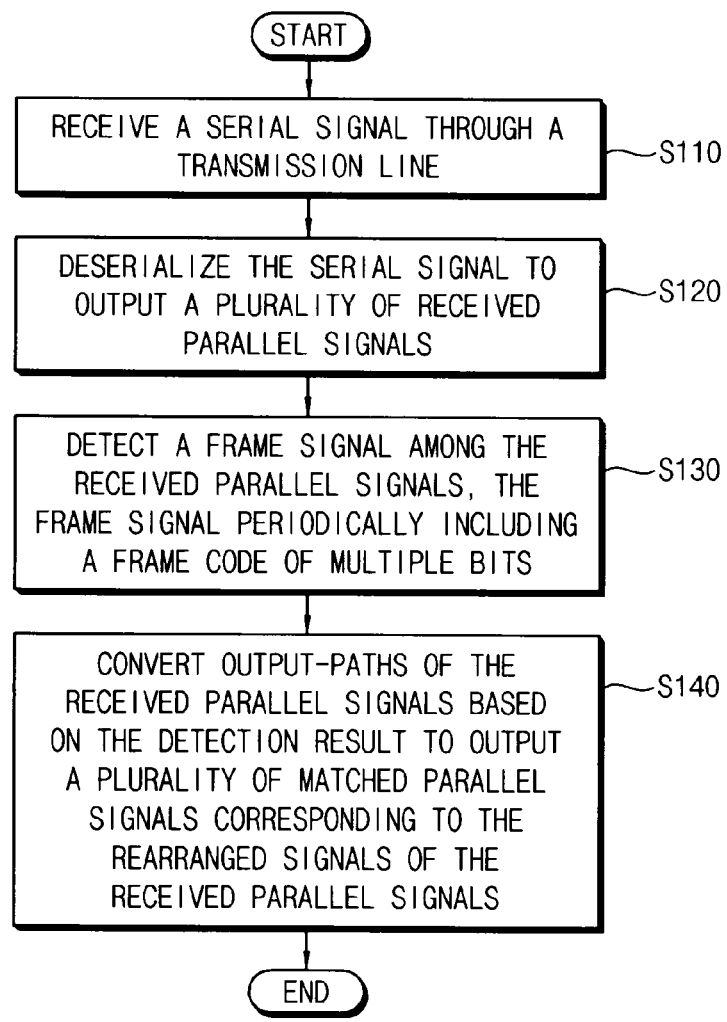
FIG. 10 is a flowchart illustrating a method of interfacing signals according to example embodiments.

FIG. 10 is a flowchart illustrating a method of interfacing signals according to example embodiments.

Referring to FIGS. 1 through 10, the interface circuit 10 receives the serial signal SR through the transmission line TLN (block S110). The deserializer 100 in the interface circuit 10 deserializes the serial signal SR to output the plurality of first parallel signals RP1 through RPk (block S120), also referred to as received parallel signals. The detection-control circuit 300 in the path converter 200 detects the frame signal BT among the received parallel signals RP1 through RPk (block S130), where the frame signal BT periodically includes the frame code FRC of the multiple frame bits F1 through Fn. The matching block 400 in the path converter 200 converts output-paths of the received parallel signals RP1 through RPk based on the matching control signal MCON corresponding to the detection result to output the plurality of matched parallel signals MRP1 through MRPk corresponding to the rearranged signals of the received parallel signals RP1 through RPk (block S140).

In implementing the interface circuit and the interfacing method according to example embodiments, the parallel interfaces of the devices to be interfaced may be used without modification and the frame synchronization may be performed in real time by the prompt multiplexing operation using the one frame signal and the path converter. Thus the integration degree of the system may be increased without excessive logics and the performance of the system may be enhanced by reducing the latency of the signal transfer.

Figure 11:
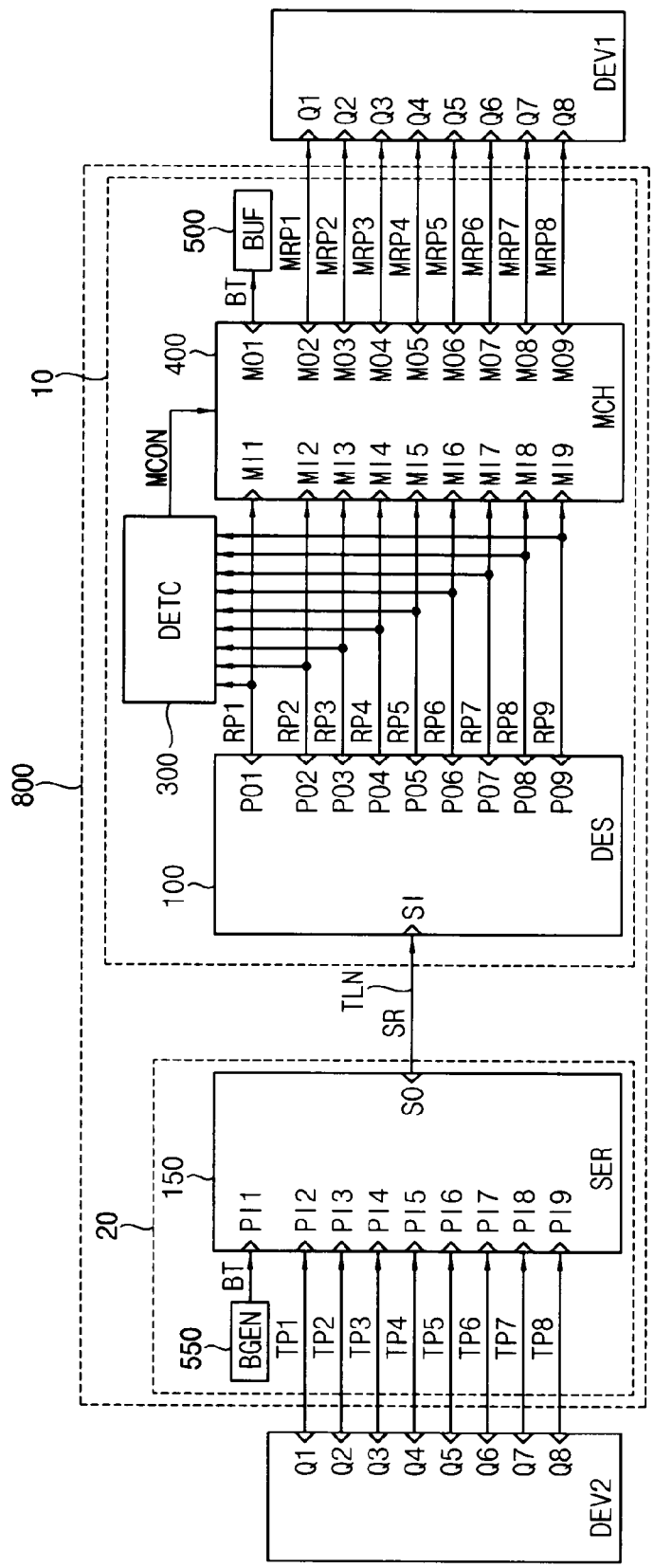
FIG. 11 is a block diagram illustrating an interface system according to example embodiments.

FIG. 11 is a block diagram illustrating an interface system according to example embodiments.

Referring to FIG. 11, an interface system 800 includes a transmission line TLN, a first interface circuit 10 and a second interface circuit 20 coupled to the first interface circuit 10 through the transmission line TLN. FIG. 11 illustrates a non-limiting interface system that serializes, deserializes and synchronizes nine parallel signals including the frame signal BT, and the number of the parallel signals and terminals may be changed variously.

FIG. 11 illustrates an example configuration for uni-directional serial communication from a second device DEV2 to a first device DEV1. For example, the second device DEV2 may be a digital signal processor, a memory controller, or an application processor, etc. and the first device DEV1 may be a memory device, a display device, etc. In one embodiment, the first and second devices DEV1 and DEV2 have parallel interfaces including input-output terminals, such as Q1 through Q8. The interface system 800 is configured to perform the serial communication between such devices DEV1 and DEV2 having the parallel interfaces. The first interface circuit 10 coupled to the first device DEV1 corresponds to a receiving interface circuit and the second interface circuit 20 coupled to the second device DEV2 corresponds to a transmitting interface circuit.

As described with reference to FIG. 1, the first interface circuit 10 includes a deserializer (DES) 100 and a path converter including a detection-control circuit (DETC) 300 and a matching block (MCH) 400. The first interface circuit 10 may further include a buffer (BUF) 500 to store information from the frame signal BT. The transmission line TLN may be, for example, an electrical line, an optical line, or other type of communication medium. In addition, if the line is an optical line or line other than an electrical line, electrical-to-optical converters, or other converters may be included in the interface circuits 10 and 20.

The deserializer 100 deserializes a serial signal SR transferred through the transmission line TLN and received at a deserializer input terminal SI to output a plurality of first parallel signals RP1 through RP9, also referred to as received parallel signals. The detection-control circuit 300 detects the frame signal BT among the received parallel signals RP1 through RP9 where the frame signal BT periodically includes a frame code of multiple bits, and the detection-control circuit 300 generates a matching control signal MCON corresponding to the detection result. The matching block 400 converts output-paths of the received parallel signals RP1 through RP9 based on the matching control signal MCON to output a plurality of second, matched parallel signals BT and MRP1 through MRP8 corresponding to rearranged signals of the first, received parallel signals RP1 through PR9. If the arrangement of the second parallel signals is adjusted compared to the arrangement of the first parallel signals, then the second parallel signals are reorganized parallel signals, which may be reordered.

The deserializer 100 may receive the serial signal SR through an input terminal SI (also referred to as a deserializer input terminal, or a serial input terminal) coupled to the transmission line TLN and output the first through ninth received parallel signals RP1 through RP9 to first through ninth output terminals PO1 through PO9, also referred to as first output terminals, or intermediate output terminals). In one embodiment, the first through ninth output terminals PO1 through PO9 of the deserializer 100 are one-to-one coupled directly to first through ninth matching input terminals MI1 through MI9 of the matching block 400. Thus the first through ninth received parallel signals RP1 through RP9 are applied to the first through ninth matching input terminals MI1 through MI9, respectively.

The matching block 400 controls, in response to the matching control signal MCON, the connections between the first through ninth matching input terminals MI1 through MI9 receiving the received parallel signals RP1 through RP9 and the first through ninth matching output terminals MO1 through MO9 outputting the matched parallel signals BT and MRP1 through MRP8. The first through ninth matching output terminals MO1 through MO9 are also referred to as second output terminals, or interface output terminals. For example, the matching block 400 may convert the output-paths of the received parallel signals RP1 through RP9 such that the frame signal BT corresponding to one of the received parallel signals RP1 through RP9 may be output through the first matching output terminal MO1 and the rest signals of the received parallel signals RP1 through RP9 may be output sequentially through the second through ninth matching output terminals MO2 through MO9. This matching scheme may apply regardless of which of the input terminals MI1 through MI9 receives the frame signal BT.

The second interface circuit 20 may include a bit stream generator (BGEN) 550 and a serializer (SER) 150. The bit stream generator 550 generates the frame signal BT periodically including the frame codes FRC. For example, the bit stream generator 550 includes a register storing the frame bits F1 through Fn forming the frame code FRC and the register may generate the frame signal BT by outputting the stored bits periodically and repeatedly. Also the frame bits F1 through Fn may be provide to the code storage 334 and may be stored therein as described with reference to FIG. 8. As such, the frame synchronization may be performed using the frame code FRC predetermined between the two interface circuits 10 and 20. The frame code need not follow a particular pattern (e.g., such as alternating ones and zeroes), but may include any pre-selected series of consecutive bits.

The serializer 150 may serialize a plurality of transmitting parallel signals BT and TP1 through TP8 including the frame signal BT to output the serial signal SR to the transmission line TLN. The transmitting parallel signals BT and TP1 through TP8, also referred to as initial parallel signals, are input to a plurality of input terminals PI1 through PI9 of the serializer 150, also referred to as serializer input terminals, according to the serialization order and the serial signal SR is output through an output terminal SO of the serializer 150.

The serializer 150 may sample the transmitting parallel signals BT and TP1 through TP8 using a clock signal of a frequency corresponding to a bit rate of the transmitting parallel signals BT and TP1 through TP8 that may be provided from the second device DEV2. The serializer 150 may generate the serial signal SR using a clock signal of a frequency corresponding to a bit rate of the serial signal SR. For example, when the number of the transmitting parallel signals BT and TP1 through TP8 is nine as illustrated in FIG. 11, the bit rate of the transmitting parallel signals BT and TP1 through TP8 may be ⅑ bit rate of the serial signal SR. In one embodiment, the serial signal SR includes commands sent, for example, during an initialization period when the two devices DEV1 and DEV2 initially communicate. For example, device DEV1 may initially send a set of commands for initiating a connection to device DEV2.

In one embodiment, the path converter including the detection-control circuit 300 and the matching block 400 of the first interface circuit 10 synchronizes the output order of the matched parallel signals BT and MRP1 through MRP8 to be identical to the serialization order of the transmitting parallel signals BT and TP1 through TP8 input to the serializer 150. As a result, the transmitting parallel signals TP1 through TP8 output from the input-output terminals Q1 through Q8 of the second device DEV2 are rearranged in the same order and may be output as the matched parallel signals MRP1 through MRP8 to be provided to the corresponding input-output terminals Q1 through Q8 of the first device DEV1.

As shown in FIG. 11, in one embodiment, a serializer includes a dedicated input terminal over which a frame code is received, and includes additional input terminals for receiving data. The interface 20 may send a frame code including frame bits and optionally control bits (discussed further below) over a dedicated input terminal (e.g., PI1) of a serializer 150. As such, the frame bits and optional control bits are always sent over a predetermined, dedicated terminal. Similarly, the interface system 800 may be configured to output the frame code from a predetermined terminal (e.g., MO1) of a matching block 400. Accordingly, all frame bits initially sent over a dedicated input terminal PI1 of serializer 150 are received at a predetermined interface output terminal MO1 of matching block 400 so that the data can be properly interpreted at a second device DEV2.

In operation, the matching block 400 reorders the first parallel signals MI1 through MI9 to output the second parallel signals MO1 through MO9. As an example, the matching block 400 may receive a first set of first parallel signals including a plurality of first parallel signals, and may detect the frame code from among the first set of first parallel signals. The frame signal may be received, for example, at a first terminal of the matching block 400 (which may be any one of terminals MI1 through MI9). For the purposes of this example, assume that the frame signal is received at terminal MI2. The matching block 400 may then reorganize output paths for the first set of first parallel signals based on the detection result, and may output the first set of first parallel signals over the reorganized output paths to output a first set of second parallel signals including a plurality of second parallel signals. The output paths may be reorganized so that the frame code is output to a predetermined output terminal, such as MO1, of matching block 400.

At a later time, a second set of first parallel signals including a plurality of first parallel signals that include a frame signal may be received by matching block 400. For this set of first parallel signals, the frame signal may be received at a different terminal than for the first set of first parallel signals. For example, it may be received at terminal MI9 of matching block 400. The matching block may then reorganize the output paths for the second set of first parallel signals. In one embodiment, it reorganizes the output paths so that the frame signal is output to the same predetermined output terminal (e.g., MO1) as for the first set of first parallel signals.

As such, the interface system 800 according to example embodiments may perform the interfacing operation between the corresponding input-output terminals Q1 through Q8, for example, the corresponding parallel interfaces of the first and second devices DEV1 and DEV2 by the prompt multiplexing operation using the one frame signal BT. Accordingly the interface system 800 may be implemented in a small size to reduce the latency of the signal transfer without the excessive information such as the packet header and tail and/or without the complex encoding/decoding processes as in the conventional arts.

FIG. 11 illustrates the configuration for the uni-directional serial communication from the second device DEV2 to the first device DEV1, but the interface system according to example embodiments may have a configuration for the bi-directional serial communication as will be further described with reference to FIG. 24. For example, the first interface circuit 10 may further include the above-mentioned bit stream generator BGEN and serializer SER configured to transmit another serial signal to the second interface circuit 20 and the second interface circuit 20 may further include the above-mentioned deserializer DES and path converter DETC and MTHC configured to receive the another serial signal from the first interface circuit 10, so that the interface system 800 may perform the bi-directional signal transfer.

The deserializer 100 and the serializer 150 may have various configurations as well known to a person skilled in the art, and thus the specific configuration of the deserializer 100 and the serializer 150 are omitted.

Figure 12:
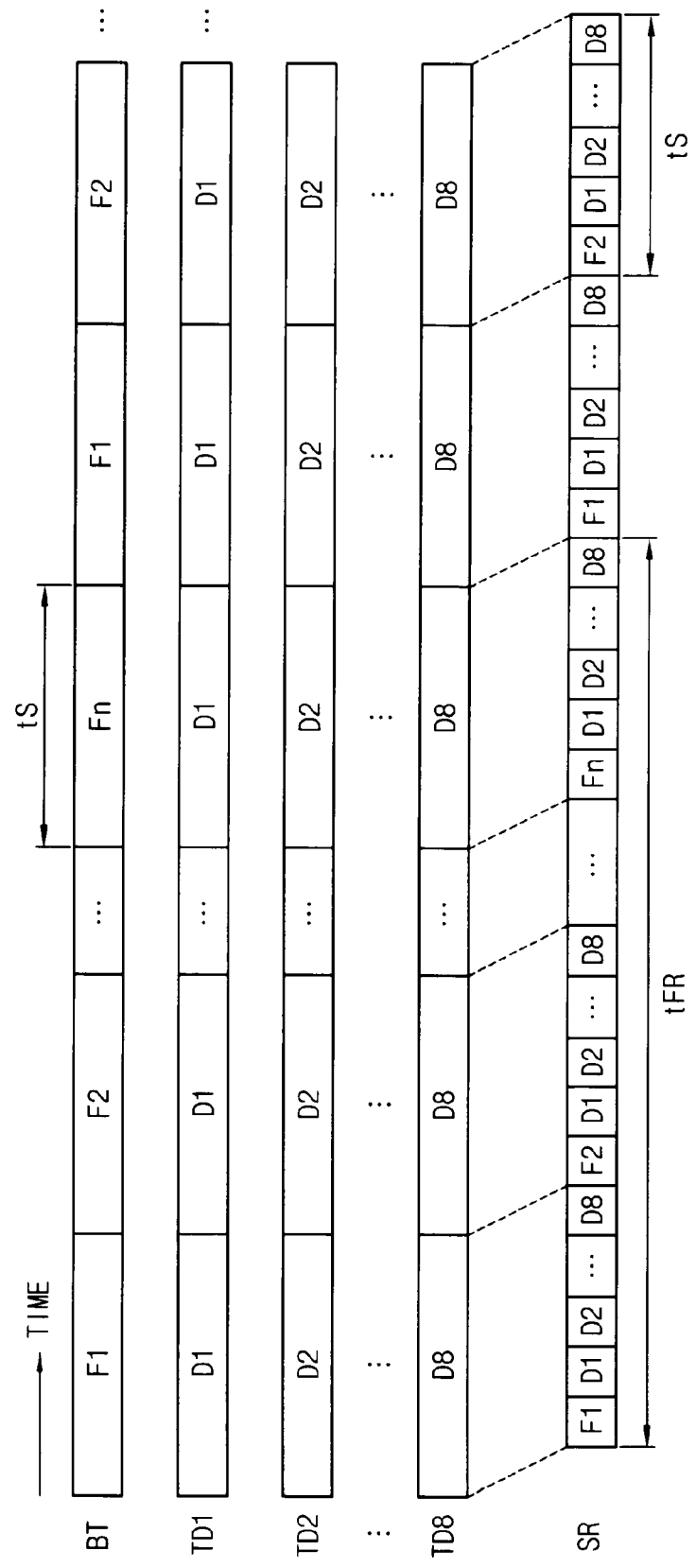
FIG. 12 is a diagram for describing an exemplary serialization process of the interface system of FIG. 11.

FIG. 12 is a diagram for describing a serialization process of the interface system of FIG. 11.

Referring to FIGS. 11 and 12, the nine transmitting parallel signals input to the serializer 150 may include one frame signal BT generated from the bit stream generator 550 and eight data signals TD1 through TD8 provide from the second device DEV2. The frame signal BT includes the frame bits F1 through Fn forming the frame code FRC, the first data signal TD1 includes first data bits D1, the second data signal TD2 includes second data bits D2, and likewise the eighth data signal TD8 includes eighth data bits D8.

The frame signal BT and the data signals TD1 through TD8 have the same bit rate, and the serializer 150 samples one bit of each of the transmitting parallel signals BT and TD1 through TD8 per sampling period, also referred to as a serialization period tS. The serializer 150 increases the bit rate of the serial signal SR so that the serial signal SR may include nine bits per serialization period tS. In other words, when the serial signal SR is generated by serializing k transmission parallel signals including one frame signal and the frame code FRC includes n frame bits F1 through Fn, n*k bits may be included in the serial signal SR per frame period tFR as illustrated in FIG. 12. In one embodiment, the serialization period tS is identical to the deserialization period tP described with reference to FIGS. 2 and 3.

The deserializer 100 in the first interface circuit 10 samples nine bits in the serial signal SR per deserialization period tP and the sampled bits are output sequentially through the output terminals PO1 through PO9. The nine received parallel signals RP1 through RP9 that are deserialized as such are output through the output terminals PO1 through PO9 and one of the first through ninth received parallel signals RP1 through RP9 corresponds to the frame signal BT periodically including the frame code FRC.

The frame signal BT may be output randomly through one of the output terminals PO1 through PO9 because the deserializer 100 in the interface circuit 10 doesn't know a start timing point of the frame, for example is, the timing point of the first frame bit F1 of the frame code FRC.

Figures 13, 14:
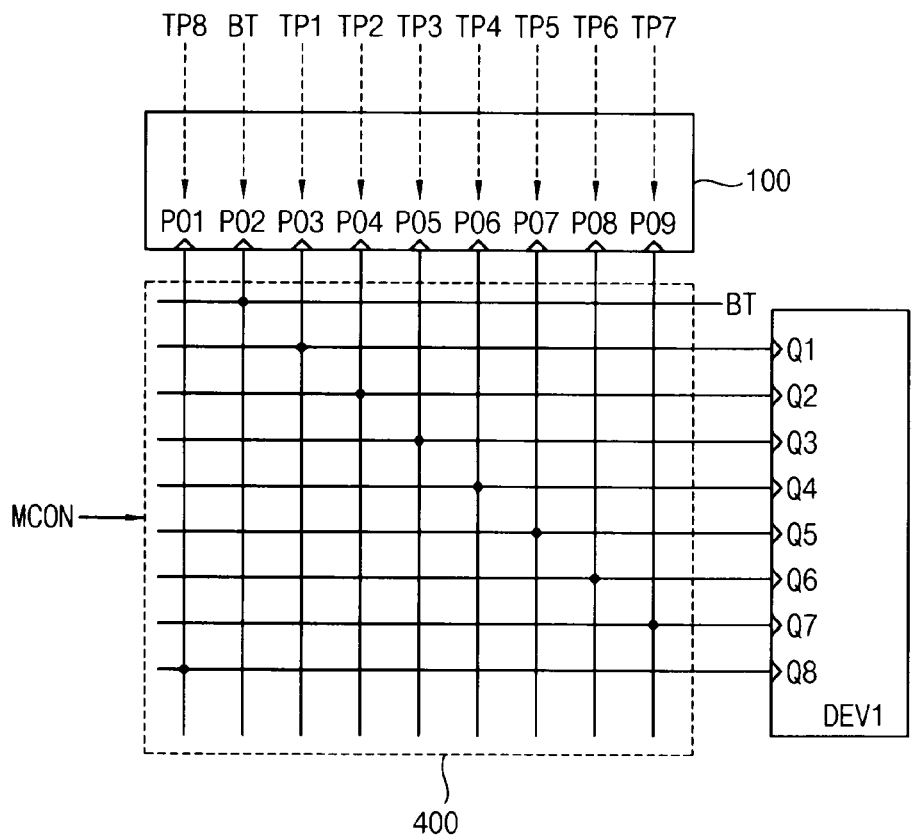
FIG. 13 is a diagram illustrating an example of received parallel signals output from a deserializer in the interface system of FIG. 11.
FIG. 14 is a diagram illustrating exemplary output-paths of a matching block in the interface system of FIG. 11 in case of the received parallel signals of the FIG. 13.

FIG. 13 is a diagram illustrating an example of received parallel signals output from a deserializer in the interface system of FIG. 11.

FIG. 13 illustrates first through ninth received parallel signals RP1 through RP9 that are input to first through ninth matching input terminals MI1 through MI9, respectively.

For example, the frame signal BT may be output as the second received parallel signal RP2 through the second output terminal PO2 of the deserializer 100. This represents that the deserializer 100 samples the serial signal SR in synchronization with the input timing of the eighth data bit D8 and outputs nine bits of the serial signal SR through the first through ninth output terminals PO1 through PO9, sequentially. As such, the eighth data signal TD8 including the eighth data bits D8 is output as the first received parallel signal RP1 through the first output terminal PO1, the frame signal including the frame bits F1 through Fn is output as the second received parallel signal RP2 through the second output terminal PO2, the first data signal TD1 including the first data bits D1 is output as the third received parallel signal RP3 through the third output terminal PO3, and likewise the seventh data signal TD7 including the seventh data bits D7 is output as the ninth received parallel signal RP9 through the ninth output terminal PO9.

As illustrated in FIG. 11, the output terminals PO1 through PO9 of the deserializer 100 may be one-to-one coupled directly to the input matching terminals MI1 through MI9 of the matching block 400. Accordingly the eighth data signal TD8 is input to the first matching input terminal MI1, the frame signal is input to the second matching input terminal MI2, the first data signal TD1 is input to the third matching input terminal MI3, and likewise the seventh data signal TD7 is input to the ninth matching input terminal MI9.

As such, the deserialization order, that is, the output order of the received parallel signals RP1 through RP9 output through the output terminals PO1 through POI9 of the deserializer 100 may be different from the serialization order of the signals BT and TP1 through TP8 input to the input terminals SI1 through SI9 of the serializer 150. As a result, the received parallel signals RP1 through RP9 as illustrated in FIG. 13, which require the frame synchronization, may be input to the matching input terminals MI1 through MI9 of the matching block 400.

FIG. 14 is a diagram illustrating output-paths of a matching block in the interface system of FIG. 11 in case of the received parallel signals of the FIG. 13, and FIG. 15 is a diagram illustrating matched parallel signals output through the output-paths of FIG. 14.

In FIG. 14, the output terminals PO1 through PO9 of the deserializer 100 are one-to-one coupled directly to the matching input terminals MI1 through MI9 of the matching block 400, the frame signal BT is output from the first matching output terminal MO1 of the matching block 400 and the second through ninth matching output terminals MO2 through MO9 are one-to-one coupled directly to the input-output terminals Q1 through Q8 of the first device DEV1. FIG. 15 illustrates the first through ninth matched parallel signals MRP1 through MRP9 output through the first through ninth matching output terminals MO1 through MO9 of the matching block 400. As described above, the matching control signal MCON may have the value corresponding to the second output terminals PO2 of the deserializer 100, through which the frame signal BT is output.

Referring to FIGS. 14 and 15, the matching block 400 connects, in response to the matching control signal MCON, the second matching input terminal MI2 to the first matching output terminal MO1, the third matching input terminal MO2 to the second matching output terminal MO2, likewise the ninth matching input terminal MI9 to the eighth matching output terminal MO8, and the first matching input terminal MI1 to the ninth matching output terminal MO9. Accordingly the frame signal BT and the data signals TD1 through TD8 may be output though the matching output terminals MO1 through MO9 of the matching block in the first interface circuit 10 in the output order synchronized with the serialization order of the serializer 150 in the second interface circuit 20.

Referring to FIG. 15, the frame signal BT including the frame bits F1 through Fn is output as the first matched parallel signal MRP1 through the first matching output terminal MO1, the first data signal TD1 including the first data bits D1 is output as the second matched parallel signal MRP2 through the second matching output terminal MO2, and likewise the eighth data signal TD8 including the eighth data bits D8 is output as the ninth matched parallel signal MRP9 through the ninth matching output terminal MO9.

As a result, the first through eighth data signals TD1 through TD8 provided from the input-output terminals Q1 through Q8 of the second device DEV2 may be output in the same order to be provided to the corresponding input-output terminals Q1 through Q8 of the first device DEV1, respectively.

Figure 16:
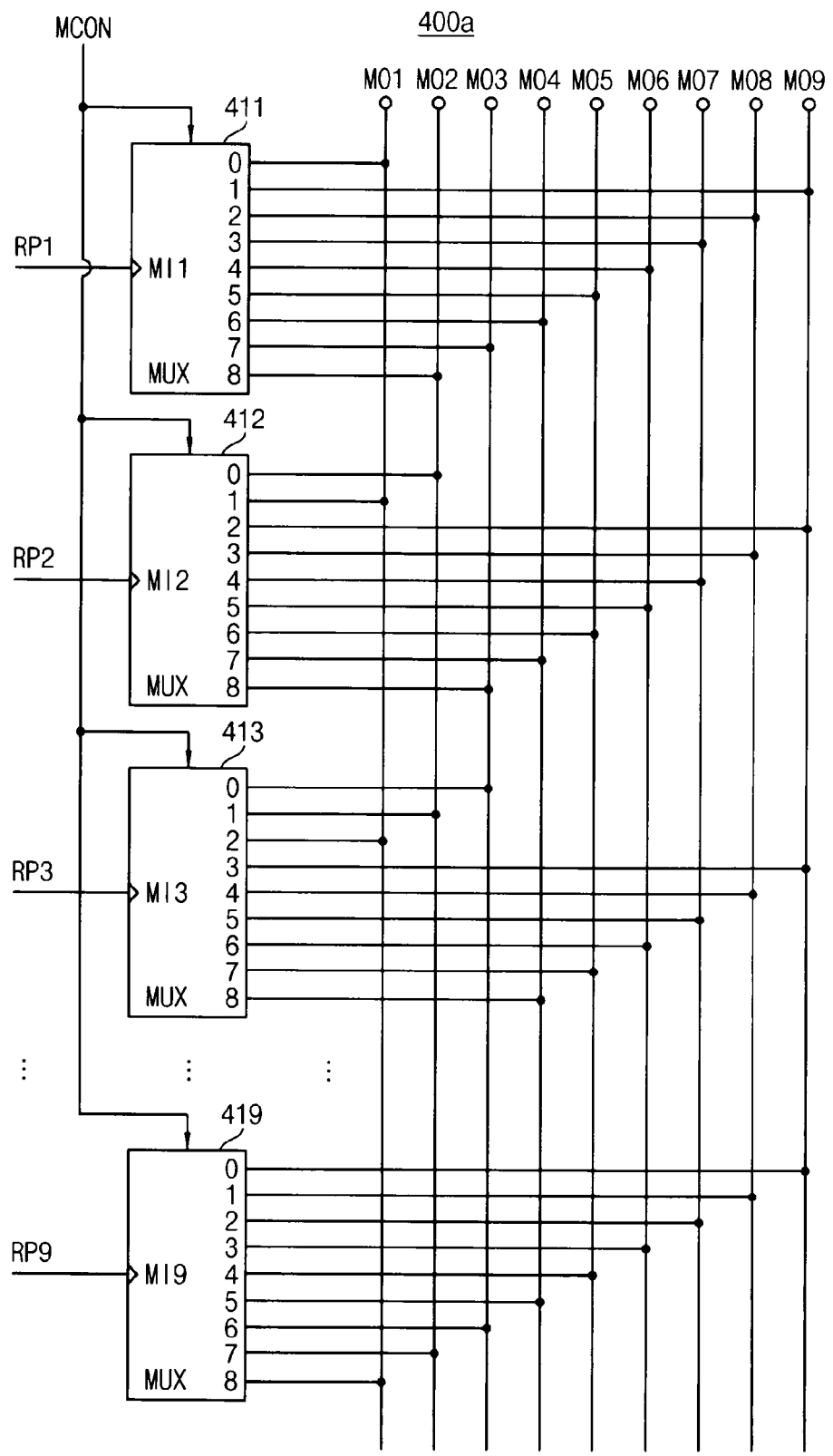
FIG. 16 is a diagram illustrating an example of a matching block in the interface system of FIG. 11.

FIG. 16 is a diagram illustrating an example of a matching block in the interface system of FIG. 11.

Referring to FIG. 16, the matching block 400a may be implemented with a plurality of multiplexers (MUX) 411 through 419. Each of the multiplexers 411 through 419 may receive each of the received parallel signals RP1 through RP9 and output each of the matched parallel signals MRP1 through MRP9 through one terminal among multiplexing output terminals 0 through 8, respectively, where the one terminal corresponds to the matching control signal MCON.

In some example embodiments, connections between the multiplexing output terminals 0 through 8 and the matching output terminals MO1 through MO9 are different from each other with respect to the multiplexers 411 through 419 and the multiplexers 411 through 419 commonly receive the matching control signal MCON of a same value.

For example, as illustrated in FIG. 16, with respect to the first multiplexer 411, the first multiplexing output terminal 0 may be connected to the first matching output terminal MO1, the second multiplexing output terminal 1 may be connected to the ninth matching output terminal MO9, the third multiplexing output terminal 2 may be connected to the eighth matching output terminal MO8, and likewise the ninth multiplexing output terminal 8 may be connected to the second matching output terminal MO2. With respect to the second multiplexer 412, the first multiplexing output terminal 0 may be connected to the second matching output terminal MO2, the second multiplexing output terminal 1 may be connected to the first matching output terminal MO1, the third multiplexing output terminal 2 may be connected to the ninth matching output terminal MO9, and likewise the ninth multiplexing output terminal 8 may be connected to the third matching output terminal MO3.

As such, the first multiplexing output terminal 0 of the first multiplexer 411 may be connected to the first matching output terminal MO1, the second multiplexing output terminal 1 of the second multiplexer 412 may be connected to the first matching output terminal MO1, the third multiplexing output terminal 2 of the third multiplexer 413 may be connected to the first matching output terminal MO1, and likewise the ninth multiplexing output terminal 8 of the ninth multiplexer 419 may be connected to the first matching output terminal MO1.

As a result, the connections between the matching input terminals MI1 through MI9 and the matching output terminals MO1 through MO9 may be controlled regardless of the value of the matching control signal MCON such that the frame signal BT of the received parallel signals RP1 through RP9 may be output through the first matching output terminal MO1 and the rest signals of the received parallel signals RP1 through RP9 may be output sequentially through the rest terminals, that is, the second through ninth matching output terminals MO2 through MO9. In this embodiment, the matching control signal MCON may be, for example, a 3-bit or 4-bit signal that causes each multiplexer to select one of the multiplexing output terminals 0-8 at which to output the received parallel signal.

Figure 17:
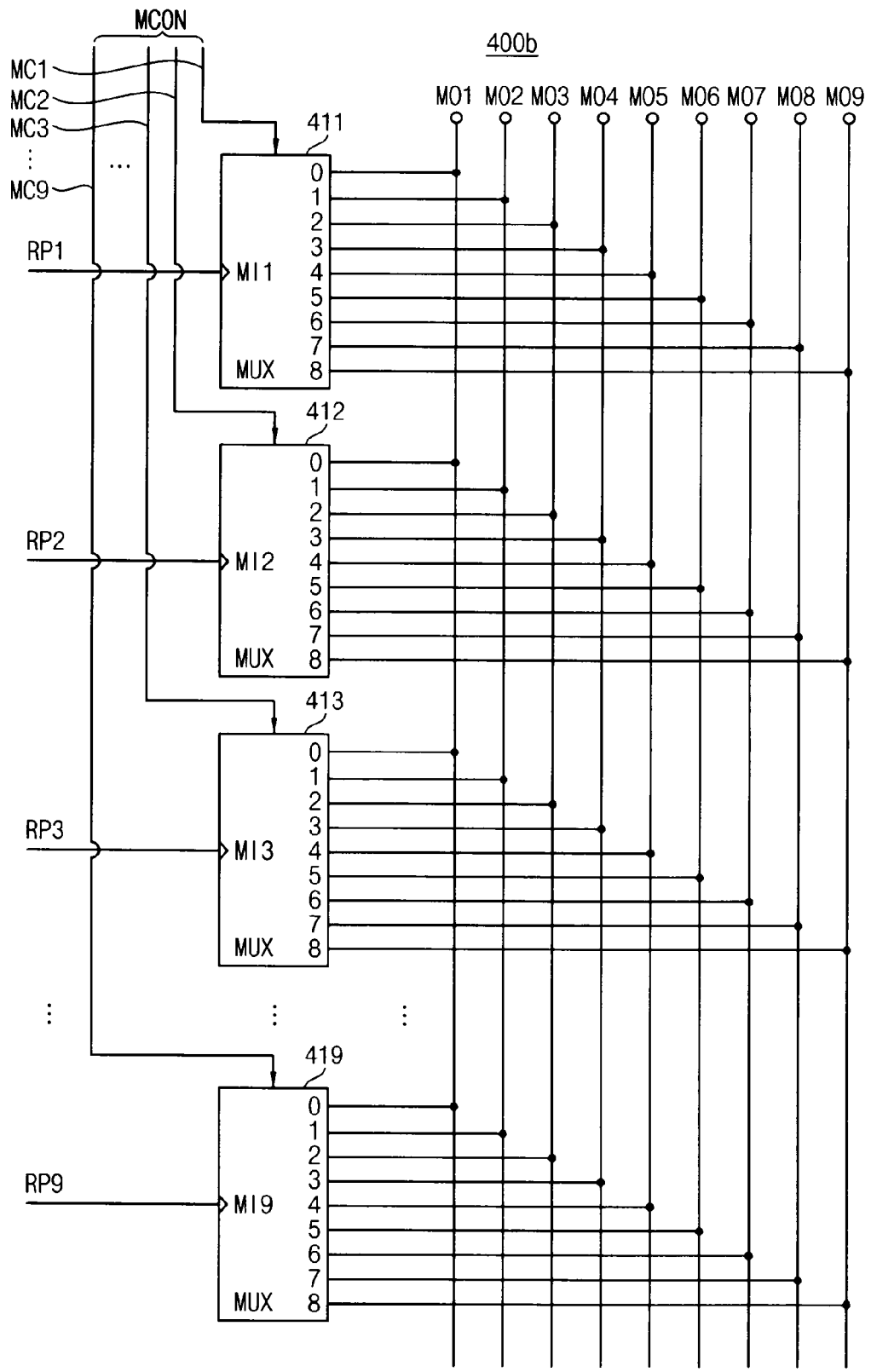
FIG. 17 is a diagram illustrating another example of a matching block in the interface system of FIG. 11.

FIG. 17 is a diagram illustrating another example of a matching block in the interface system of FIG. 11, and FIG. 18 is a diagram illustrating an example of a matching control signal provided to the match block of FIG. 17.

Referring to FIG. 17, the matching block 400b may be implemented with a plurality of multiplexers 411 through 419. Each of the multiplexer 411 through 419 may receive each of the received parallel signals RP1 through RP9 and output each of the matched parallel signals MRP1 through MRP9 through one terminal among multiplexing output terminals 0 through 8, respectively, where the one terminal corresponds to the matching control signal MCON.

In some example embodiments, connections between the multiplexing output terminals 0 through 8 and the matching output terminals MO1 through MO9 are identical to each other with respect to the multiplexers 411 through 419 and the multiplexers 411 through 419 respectively receive the matching control signal MCON of different values MC1 through MC9.

For example, as illustrated in FIG. 17, with respect to all of the multiplexers 411 through 419, the first multiplexing output terminal 0 may be connected to the first matching output terminal MO1, the second multiplexing output terminal 1 may be connected to the second matching output terminal MO2, the third multiplexing output terminal 2 may be connected to the third matching output terminal MO3, and likewise the ninth multiplexing output terminal 8 may be connected to the ninth matching output terminal MO9. Instead of connecting the multiplexing output terminals 0 through 8 to the matching output terminals MO1 through MO9 in the same way with respect to all of the multiplexers 411 through 419, the matching control bits MC1 through MC9 respectively provided to the multiplexers 411 through 419 may be different from each other to perform multiplexing operation between the nine matching input terminals MI1 through MI9 and the nine matching output terminals MO1 through MO9.

FIG. 18 illustrates an example of the matching control bits MC1 through MC9 in case that the third received parallel signal RP3 corresponds to the frame signal BT. In this case, the third matching control bits MC3 have a value of 0, the fourth matching control bits MC4 have a value of 1, likewise the matching control bits increase by one, the ninth matching control bits MC9 have a value of 6, the first matching control bits MC1 have a value of 7, and the second matching control bits MC2 have a value of 8. The third multiplexer 413 selects the first multiplexing output terminal 0 corresponding to the third matching control bits MC3 of 0 so that the third received parallel signal RP3 corresponding to the frame signal BT may be output as the first matched parallel signal MRP1 through the first matching output terminal MO1, the fourth multi-plexer 414 selects the second multiplexing output terminal 1 corresponding to the fourth matching control bits MC4 of 1 so that the fourth received parallel signal RP4 corresponding to the first data signal TD1 may be output as the second matched parallel signal MRP2 through the second matching output terminal MO2, likewise the ninth multiplexer 419 selects the seventh multiplexing output terminal 6 corresponding to the ninth matching control bits MC9 of 6 so that the ninth received parallel signal RP9 corresponding to the sixth data signal TD6 may be output as the ninth matched parallel signal MRP9 through the ninth matching output terminal MO9, the first multiplexer 411 selects the eighth multiplexing output terminal 7 corresponding to the first matching control bits MC1 of 7 so that the first received parallel signal RP1 corresponding to the seventh data signal TD7 may be output as the eighth matched parallel signal MRP8 through the eighth matching output terminal MO8, and the second multiplexer 412 selects the ninth multiplexing output terminal 8 corresponding to the second matching control bits MC2 of 8 so that the second received parallel signal RP2 corresponding to the eighth data signal TD8 may be output as the ninth matched parallel signal MRP9 through the ninth matching output terminal MO9.

As a result, the connections between the matching input terminals MI1 through MI9 and the matching output terminals MO1 through MO9 may be controlled regardless of the value of the matching control signal MCON such that the frame signal BT of the received parallel signals RP1 through RP9 may be output through the first matching output terminal MO1 and the rest signals of the received parallel signals RP1 through RP9 may be output sequentially through the rest terminals, that is, the second through ninth matching output terminals MO2 through MO9.

Figure 19:
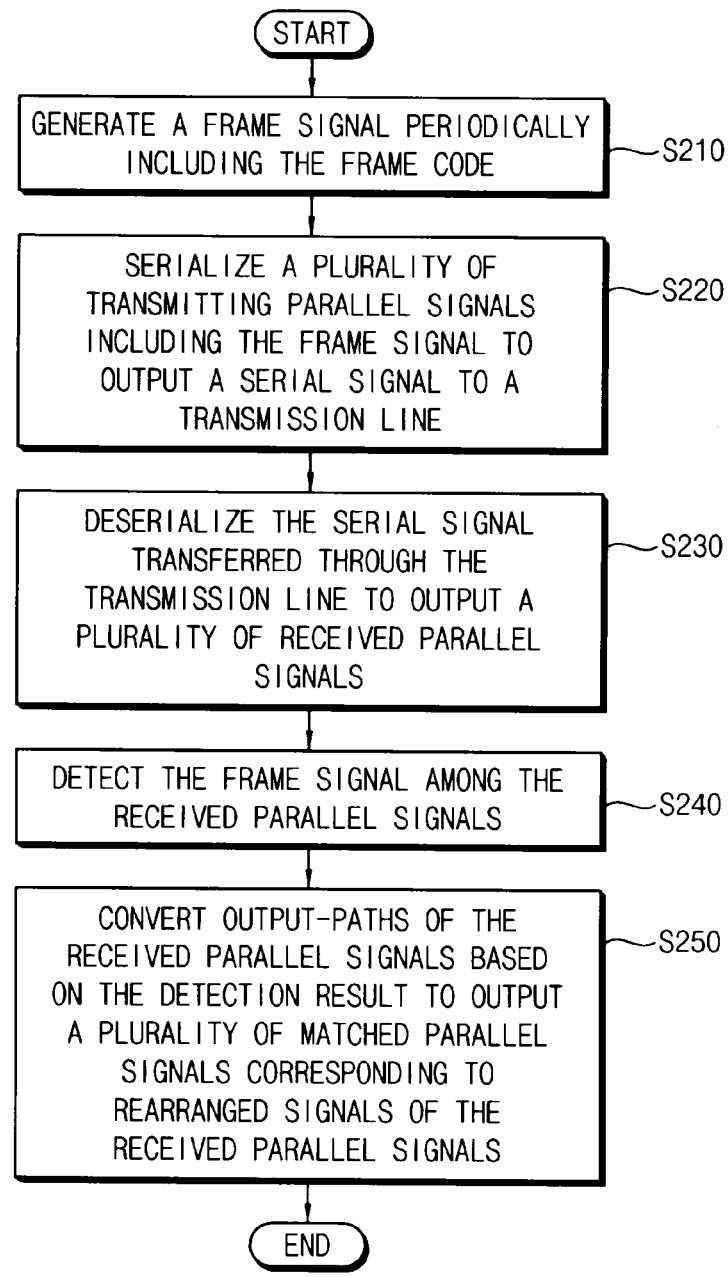
FIG. 19 is a flowchart illustrating a method of interfacing signals according to example embodiments.

FIG. 19 is a flowchart illustrating a method of interfacing signals according to example embodiments.

Referring to FIGS. 11 through 19, the bit stream generator 550 in the second interface circuit 20 generates the frame signal periodically including the frame code FRC (block S210). The serializer 150 in the second interface circuit 20 serializes a plurality of transmitting parallel signals BT and TD1 through TD8 including the frame signal BT to output the serial signal SR to the transmission line TLN (block S220). The deserializer 100 in the first interface circuit 10 deserializes the serial signal SR transferred through the transmission line TLN to output a plurality of received parallel signals RP1 through RP9 (block S230). The detection-control circuit 200 in the first interface circuit 10 detects the frame signal BT among the received parallel signals RP1 through RP9 (block S240) and generates the matching control signal MCON corresponding the detection result. The matching block 400 in the first interface circuit 10 converts output-paths of the received parallel signals RP1 through RP9 based on the matching control signal MCON corresponding to the detection result to output a plurality of matched parallel signals MRP1 through MRP9 corresponding to rearranged signals of the received parallel signals RP1 through RP9 (block S250).

In the Ethernet protocol adopting the packet transfer, the transfer bandwidth is limited due to the overhead of the headers and tails of the packets and thus the sufficient quality of service (QoS) may not be secured. In addition, the logics for supporting the layers such as MAC, LLC, etc. are required in case of Ethernet protocol and thus the system size and the manufacturing cost may be increased.

In the 8B/10B encoding/decoding scheme, the transfer efficiency is degraded since 10 bits are serialized to transfer 8 bits. In addition, the sampled bits of the received serial signal have to be stored to be decoded to perform the frame synchronization and thus the transfer latency is increased and the complex logics for encoding/decoding is required.

In implementing the interface circuit and the interfacing method according to example embodiments, the parallel interfaces of the devices to be interfaced may be used without modification and the frame synchronization may be performed in real time by the prompt multiplexing operation using the one frame signal and the path converter. Thus the integration degree of the system may be increased without excessive logics and the performance of the system may be enhanced by reducing the latency of the signal transfer.

In some example embodiments, as will be described with reference to FIGS. 25 and 26, the signals to be transferred may be divided into a plurality of groups, and the above-described serialization, deserialization, detection of the frame signal and output-paths conversion may be performed with respect to each group of signals.

Figures 20, 21:
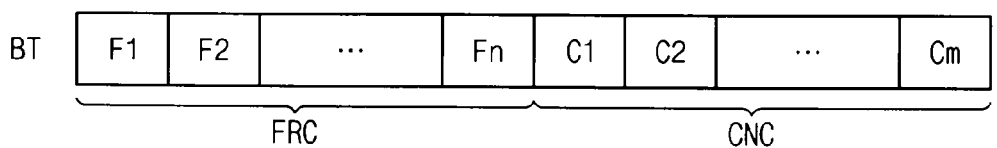
FIG. 20 is a diagram illustrating a frame signal used by an interface system according to example embodiments.
FIG. 21 is a diagram illustrating an example of matched parallel signals corresponding to the frame signal of FIG. 20.

FIG. 20 is a diagram illustrating a frame signal used by an interface system according to example embodiments, and FIG. 21 is a diagram illustrating an example of matched parallel signals corresponding to the frame signal of FIG. 20.

Embodiments where the frame signal BT periodically includes the frame code FRC alone have been described with reference to FIGS. 1 through 19, but the frame signal BT may further include other codes or bits irrelevant to the frame synchronization. For example, the frame signal BT may periodically include the frame code FRC of multiple bits for the frame synchronization and a control code CNC of multiple bits that may be used to control the interface circuit.

The numbers of the frame bits F1 through Fn of the frame code FRC and the control bits C1 through Cm of the control code CNC may be variously changed. The frame code FRC may be used for the frame synchronization, that is, the synchronization of the output order of the matched parallel signals output from the matching block 400, and the control code CNC may include the information on the control of the interface system 800. For example, the control code CNC may include the information for testing and training the interface system 800 and/or the information for representing the status of the transmission line TLN or the entire interface system 800. The control code CNC may be stored in the buffer 500 illustrated in FIG. 11 after the frame synchronization is completed and the stored value may be used to control the interface system 800.

For example, when the serial signal SR is generated by serializing k transmission parallel signals including one frame signal BT, the frame code FRC includes n frame bits F1 through Fn and the control code CNC includes m control bits C1 through Cm, one frame may include (n+m)*k as illustrated in FIG. 21. Because the bits that represent the frame code FRC are used to determine the start of a frame, these frame code bits may be referred to as a frame start code that indicates the start of a frame.

Figure 22:
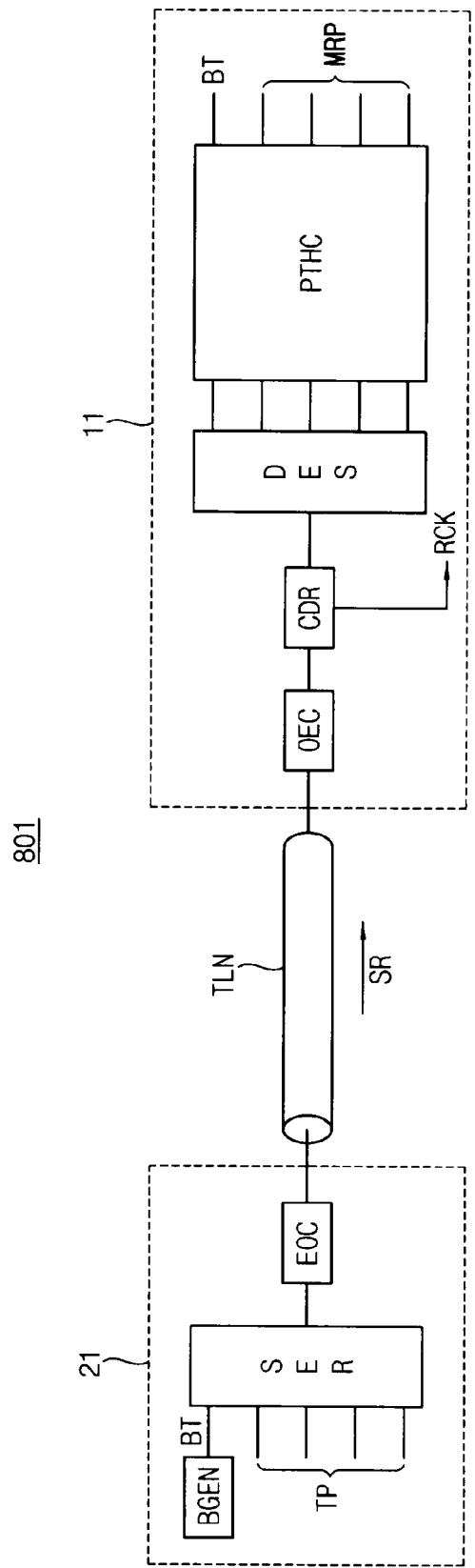
FIG. 22 is a block diagram illustrating an optical interface system according to example embodiments.

FIG. 22 is a block diagram illustrating an optical interface system according to example embodiments.

Referring to FIG. 22, an interface system 801 may include a transmission line TLN, a first interface circuit 11 and a second interface circuit 21 coupled to the first interface circuit 11 through the transmission line TLN. FIG. 22 illustrates a non-limiting interface system that serializes, deserializes and synchronizes five parallel signals BT and TP including the frame signal BT, and the number of the parallel signals may be changed variously.

As described with reference to FIG. 11, the first interface circuit 11 includes a deserializer DES and a path converter PTHC including a detection-control circuit and a matching block. The deserializer DES may deserialize a serial signal SR transferred through the transmission line TLN to output a plurality of received parallel signals. The path converter PTHC may detect the frame signal BT periodically including a frame code of multiple bits among the received parallel signals and convert output-paths of the received parallel signals based on the detection result to output a plurality of matched parallel signals BT and MRP corresponding to the rearranged signals of the received parallel signals.

As described with reference to FIG. 11, the second interface circuit 21 includes a bit stream generator BGEN and a serializer SER. The bit stream generator BGEN may generate the frame signal BT periodically including the frame codes FRC. The serializer SER may serialize a plurality of transmitting parallel signals BT and TP including the frame signal BT to output the serial signal SR to the transmission line TLN.

In some example embodiments, the interface system 801 may be an optical interface system. In this case, the transmission line TLN may be an optical transmission line such as an optical fiber, an optical waveguide, an optical printed circuit board, etc. The serial signal SR may be an optical signal transferred through such optical transmission line. To interface the optical signal, the first interface circuit 11 may further include a photoelectric converter OEC and the second interface circuit 21 may further include an electrophotic converter EOC.

The electrophotic converter EOC in the second interface circuit 21 may include an element such as a laser diode to convert an electric signal to an optical signal SR to be output to the optical transmission line TLN, and the photoelectric converter OEC may include an element such as a photodiode to convert the optical signal SR to an electrical serial signal.

The interface system 801 may operate based on an external clock signal as will be described with reference to FIG. 24. It is difficult, however, to synchronize the operational timing based on the external clock signal in case that the interface operates at high speed. Particularly in case of signal transfer using the optical signal SR in the optical interface system 801, the synchronization based on the external clock signal is very difficult since the bit rate of the optical signal SR exceeds a few Gbps.

As illustrated in FIG. 22, the first interface circuit 11 may further include a clock-data recovery circuit CDR. The clock-data recovery circuit CDR may generate a recovered clock signal RCK based on the electric serial signal from the photoelectric converter OEC and sample the electric serial signal based on the recovered clock signal RCK to generate a retimed serial signal that is provided to the deserializer DES.

Even though not illustrated, the interface circuit and the interface system of FIGS. 1, 11, 24, 25, 26 and 27 may further include elements for the optical communication as described with reference to FIG. 22.

Figure 23:
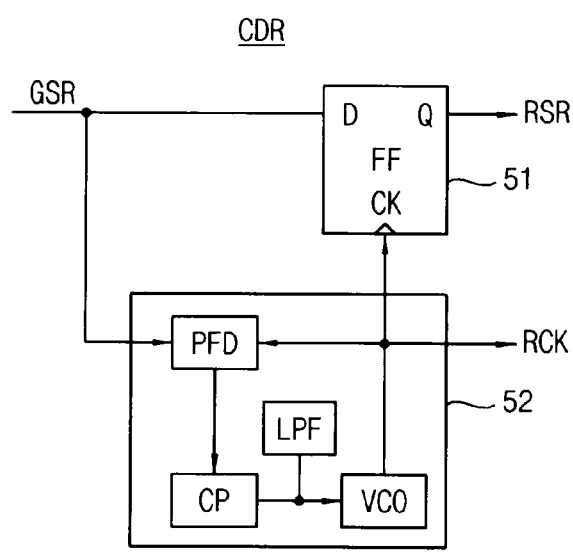
FIG. 23 is a block diagram illustrating an exemplary clock-data recovery circuit in the optical interface system of FIG. 22.

FIG. 23 is a block diagram illustrating an exemplary clock-data recovery circuit in the optical interface system of FIG. 22.

Referring to FIG. 23, the clock-data recovery circuit CDR may include a sampling circuit 51 and a phase-locked loop 52.

The phase-locked loop 52 may include a phase-frequency detector PFD, a low pass filter LPF, a charge pump CP and a voltage-controlled oscillator VCO. The phase-frequency detector PFD may detect the phase and frequency of the received serial signal GSR and output the comparison result of the difference between the received serial signal GSR and the fed-back recovered clock signal RCK. The charge pump CP may generate a control voltage based on the output of the phase-frequency detector PFD, and the voltage-controlled oscillator VCO may generate the recovered clock signal RCK based on the control voltage that is filter by the low pass filter LPF.

The sampling circuit 51 may include a flip-flop FF that samples the received serial signal GSR input to the data terminal D in response to the recovered clock signal RCK applied to the clock terminal CK and outputs the retimed serial signal RSR through the output terminal Q. The jitter noises in the received serial signal GSR may be removed by the sampling circuit 51 and the recovered clock signal RCK and the jitter-removed retimed serial signal RSR may be provided to the deserializer DES, etc.

Figure 24:
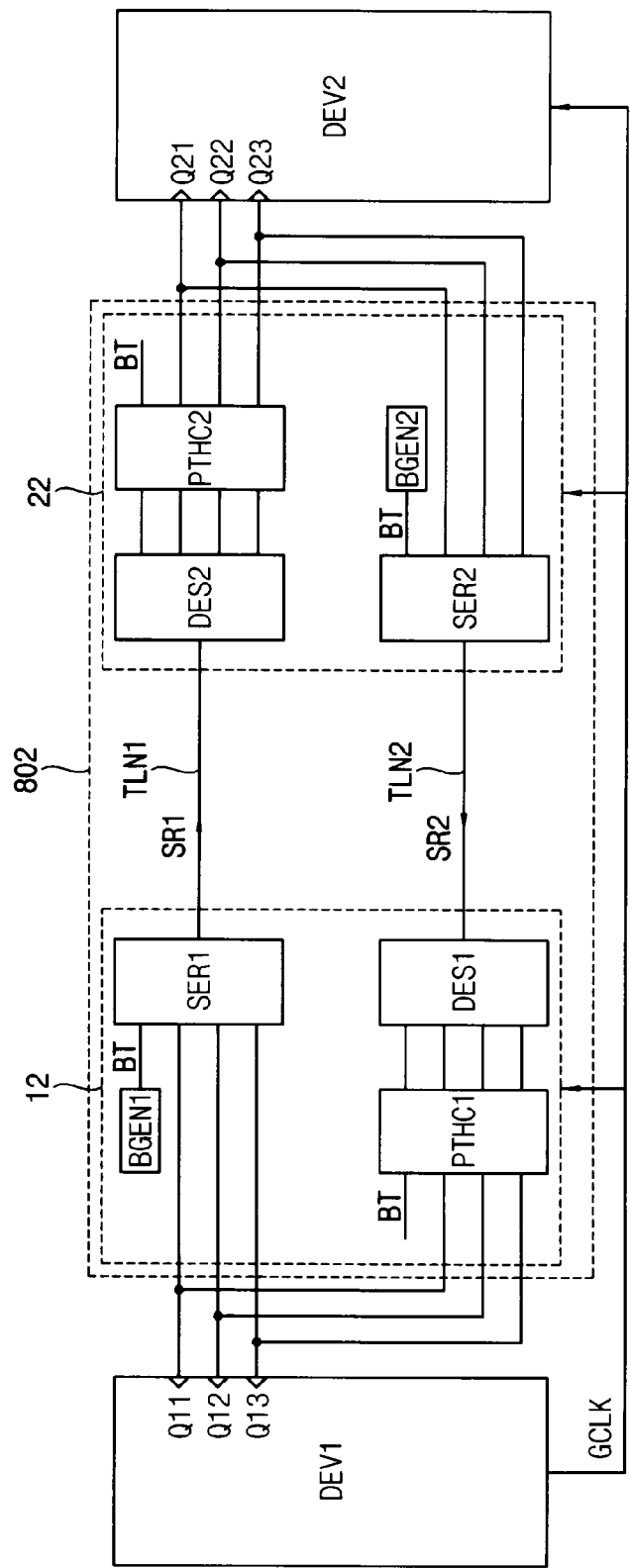
FIG. 24 is a block diagram illustrating a bi-directional interface system according to example embodiments.

FIG. 24 is a block diagram illustrating a bi-directional interface system according to example embodiments.

Referring FIG. 24, an interface system 802 may include a first transmission line TLN1, a second transmission line TLN2, a first interface circuit 12 and a second interface circuit 22 coupled to the first interface circuit 12 through the first transmission line TLN1 and the second transmission line TLN2.

The first interface circuit 12 may include a first bit stream generator BGEN1 and a first serializer SER1, which are configured to serialize signals from a first device DEV1 to transmit a first serial signal SR1 through the first transmission line TLN1, and a first deserializer DES1 and a first path converter PTHC1, which are configured to deserialize a second serial signal SR2 transferred through the second transmission line TLN2 and perform frame synchronization of the deserialized signals to be provided to the first device DEV1.

The second interface circuit 22 may include a second bit stream generator BGEN2 and a second serializer SER2, which are configured to serialize signals from a second device DEV2 to transmit the second serial signal SR2 through the second transmission line TLN2, and a second deserializer DES2 and a second path converter PTHC2, which are configured to deserialize the first serial signal SR1 transferred through the first transmission line TLN1 and perform frame synchronization of the deserialized signals to be provided to the second device DEV2.

In one embodiment, the configurations and operations of the bit stream generators BGEN1 and BGEN2, the serializers SER1 and SER2, the deserializers DES1 and DES2 and the path converters PTHC1 and PTHC2 are the same as described above, and the repeated descriptions are omitted.

The first interface circuit 12 is coupled to input-output terminals Q11, Q12 and Q13, which may form the parallel interface of the first device DEV1, the second interface circuit 22 is coupled to input-output terminals Q21, Q22 and Q23, which may form the parallel interface of the second device DEV2, and thus the interface system 802 interfaces the signal transfer between the first device DEV1 and the second device DEV2.

As described above, each of the path converters PTHC1 and PTHC2 detects the frame signal BT periodically including a frame code of multiple bits among the received parallel signals from each of the deserializers DES1 and DES2 and converts output-paths of the received parallel signals based on the detection result to output a plurality of matched parallel signals corresponding to the rearranged signals of the received parallel signals. The matching output terminals of the path converters PTHC1 and PTHC2 are directly coupled to the input-output terminals Q11, Q12, Q13, Q21, Q22 and Q23 of the devices DEV1 and DEV2, respectively. As a result, the matched parallel signals, the output order of which are synchronized, may be transferred in real time to the input-output terminals of the receiving device corresponding to the input-output terminals of the transmitting device.

As described above, the bi-directional interface system 802 according to example embodiments may match one-to-one connections between the parallel interfaces of the devices DEV1 and DEV2 by the prompt multiplexing operation using the one frame signal BT. Accordingly the integration degree of the system may be increased without excessive logics and the performance of the system may be enhanced by reducing the latency of the signal transfer.

In some example embodiments, the interface system 802 may operate based on a clock signal GCLK provided from the first device DEV1. For example, if the first device DEV1 is a memory controller and the second device DEV2 is a memory device, the clock signal GCLK may be provided from the memory controller DEV2 to the memory device DEV1. Also the clock signal GCLK may be provided to the interface system 802 and the interface system 802 may set the operational timings of the serialization and the deserialization based on the received clock signal GCLK and/or a multiplied clock signal from the received clock signal GCLK.

Figure 25:
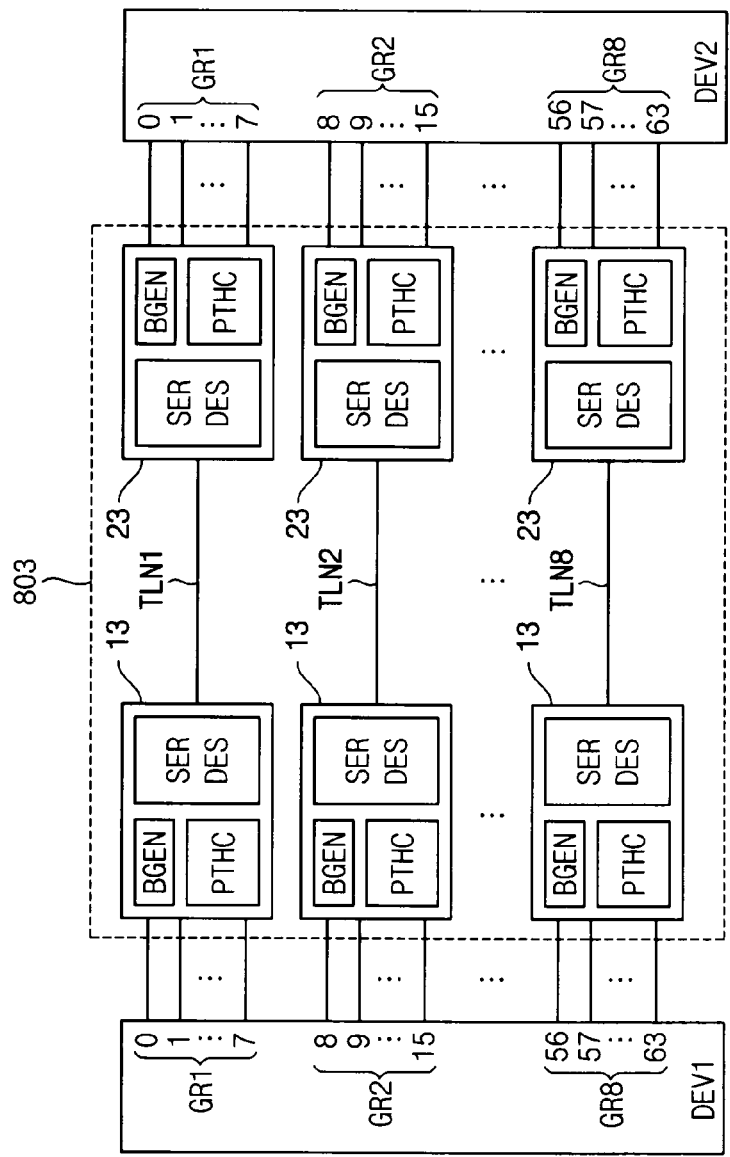
FIG. 25 is a block diagram illustrating an interface system according to example embodiments.

FIG. 25 is a block diagram illustrating an interface system according to example embodiments.

Referring to FIG. 25, an interface system 803 may have a configuration to divide signals transferred between first and second devices DEV1 and DEV2 into a plurality of groups GR1 through GR8 and each group may be transferred through a plurality of transmission lines TLN1 through TLN8, respectively. Each of transmission lines TLN1 through TLN8 may be one line or a line pair for bi-directional communication. FIG. 25 illustrates a non-limiting example that 64 signals are divided into 8 groups for convenience of illustration and description, the number of the signals may be changed variously according to the kind and configuration of the devices DEV1 and DEV2 and the number of the groups may be changed variously according to the operational speed, the kind of the transferred signals and the targeted bandwidth, etc. For example, 64 input-output pins of the devices DEV1 and DEV2 may be divided by eight into eight groups GR1 through GR8.

To perform the above-described serialization, deserialization, detection of the frame signal and output-paths conversion with respect to each group, the interface system 803 may have the corresponding number of the interface circuits 13 and 14. Each of the interface circuits 13 and 23 may include a bit stream generator BGEN, a serializer-deserializer SERDES and a path converter PTHC as illustrated in FIG. 25. The bit stream generator BGEN may generate the above-described frame signal. Even though FIG. 25 illustrates that each of the interface circuit includes the bit stream generator BGEN, two or more interface circuits may share the bit stream generator BGEN and some interface circuits may omit the bit stream generator BGEN.

The serializer-deserializer SERDES may include the above-described serializer and/or deserializer. The path converter PTHC may detect the frame signal periodically including the frame code of multiple bits among the received parallel signals from the deserializer and convert output-paths of the received parallel signals based on the detection result to output a plurality of matched parallel signals corresponding to the rearranged signals of the received parallel signals.

FIG. 25 illustrates that all of the interface circuits 13 and 23 have the configuration for bi-directional communication, but some interface circuits may have a configuration for uni-directional communication. In case of the uni-directional communication, the serializer-deserializer SERDES may selectively include the serializer or the deserializer and the path converter PTHC may be omitted.

As such, high bandwidth of the entire transferred signals may be achieved by appropriately grouping the transferred signals considering the operational speeds of the devices DEV1 and DEV2, the characteristics of the interface system 803, etc. In certain situations, when only one transmission line is used to transfer the entire signal, the entire bandwidth of the transferred signal might not exceed the bandwidths of the one transmission line. For example, when 64-bit data of DRAM module are transferred using the one optical transmission line of 40 Gbps, the bandwidth of one data pin is limited to 40 Gbps/64=0.625 Gbps even though excluding control/address pins. Thus the performance of the system is degraded since such bandwidth may not support 2 Gbps corresponding to the performance of the currently used DRAM module. By grouping the transferred signals and performing the serial communication through the appropriate number of the transmission lines as illustrated in FIG. 25, the interfacing operation of supporting the signal transfer of high bandwidth may be realized.

Figure 26:
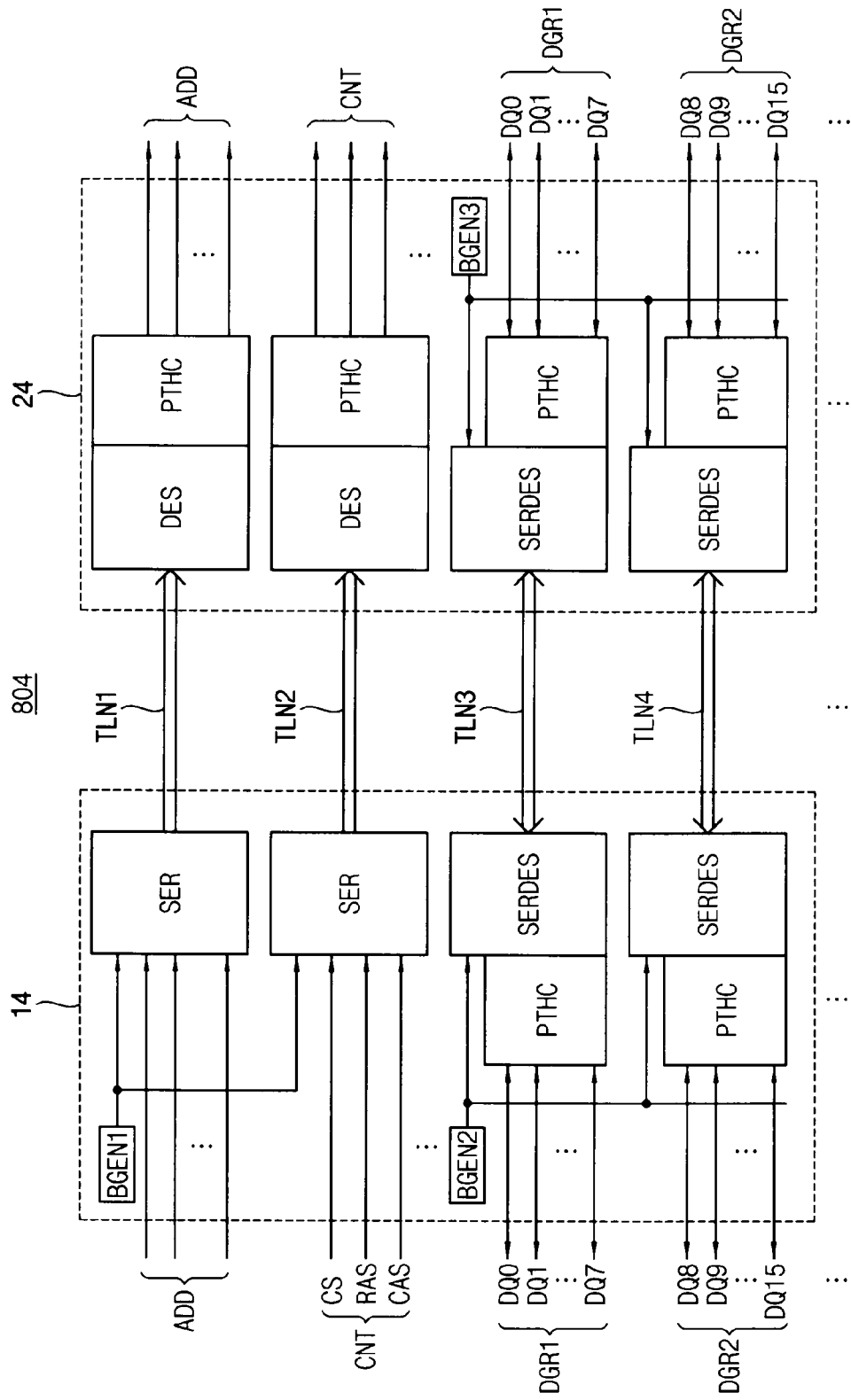
FIG. 26 is a block diagram illustrating a memory interface system according to example embodiments.

FIG. 26 is a block diagram illustrating a memory interface system according to example embodiments.

Referring to FIG. 26, an interface system 804 may include a plurality of transmission line TLN1 through TLN4, a first interface circuit 14 and a second interface circuit 24 coupled to the first interface circuit 14 through the transmission lines TLN1 through TLN4.

For example, the first interface circuit 14 may be coupled to a memory controller, the second interface circuit 24 may be coupled to a memory device, and thus the interface system 804 may interface the signal transfer between the memory controller and the memory device.

As described above, the interface system 804 may have the configuration to divide signals transferred between the memory controller and the memory device into a plurality of groups to transfer the grouped signals through the transmission lines TLN1 through TLN4, respectively. For example, address signals ADD and control signals CNT such as a chip selection signal CS, a row access strobe signal RAS, a column access strobe signal CAS, etc. may be divided into one or more groups. In addition, the data signals DQ1 through DQ15 may be divided into one or more data groups DRG1 and DRG2.

In some example embodiments, the address signals ADD and the control signals CNT may be transferred through the uni-directional transmission lines TLN1 and TLN2. For the uni-directional communication, the first interface circuit 14 may include the bit stream generator BGEN1 and the serializers SER and the second interface circuit 24 may include the deserializers DES and the path converters PTHC, as illustrated in FIG. 26.

In other example embodiments, the transmission lines TLN1 and TLN2 for transferring the address signals ADD and the control signals CNT may be implemented with the bi-directional ones. In this case, additional information of the memory device may be transferred through the transmission lines TLN1 and TLN2 from the memory device to the memory controller.

The data groups DGR1 and DGR2 may be transferred between the first and second interface circuits 14 and 24 through the bi-directional transmission lines TLN3 and TLN4. For the bi-directional communication, both of the first and second interface circuit 14 and 24 may include the bit stream generators BGEN2 and BGEN3, the serializer-deserializers SERDES and the path converters PTHC, respectively. In some example embodiments, the data signals forming one byte may be grouped in the same data group and thus skews of the data signals within the same byte may be reduced.

In case of interfacing between the memory controller and the memory device, a clock signal may be provided from the memory controller to the memory device. The serializer-deserializer SERDES in the interface system 804 may generate, using a phase-locked loop, a multiplied clock signal having a higher frequency based on the clock signal from the memory controller, to serialize the parallel signals and sample the received serial signal. Alternatively, the interface system 804 may include the clock-data recovery circuit to generate the recovered clock signal as described with reference to FIG. 22.

Figure 27:
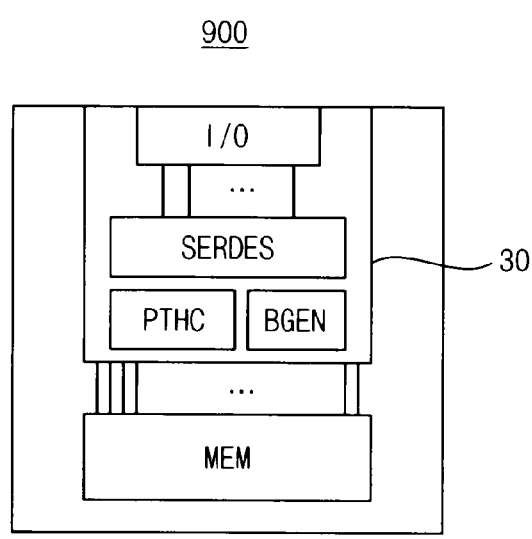
FIG. 27 is a block diagram illustrating a storage device according to example embodiments.

FIG. 27 is a block diagram illustrating a storage device according to example embodiments.

Referring to FIG. 27, a storage device 900 may include an interface circuit 30 and a memory MEM. The interface circuit 30 interfaces signal transfer between the memory MEM and an external device. The interface circuit may include an input-output circuit I/O, a serializer-deserializer SERDES, a bit stream generator BGEN and a path converter PTHC.

The input-output circuit I/O may include a connection module, a photoelectric converter, an electrophotic converter, etc. The bit stream generator BGEN may generate the above-described frame signal. The serializer-deserializer SERDES may include the above-described serializer and deserializer. As described above, the path converter PTHC may detect the frame signal periodically including the frame code of multiple bits among the received parallel signals from the deserializer and convert output-paths of the received parallel signals based on the detection result to output a plurality of matched parallel signals corresponding to the rearranged signals of the received parallel signals.

For example, the memory MEM may include a dynamic random access memory (DRAM), a mobile DRAM, a static random access memory (SRAM), a phase random access memory (PRAM), a ferroelectric random access memory (FRAM), a resistive random access memory (RRAM), a magnetic random access memory (MRAM) and/or a flash memory. The storage device 900 may be a solid state drive (SSD) device, a hard disk drive (HDD) device, a CD-ROM device, etc.

Figure 28:
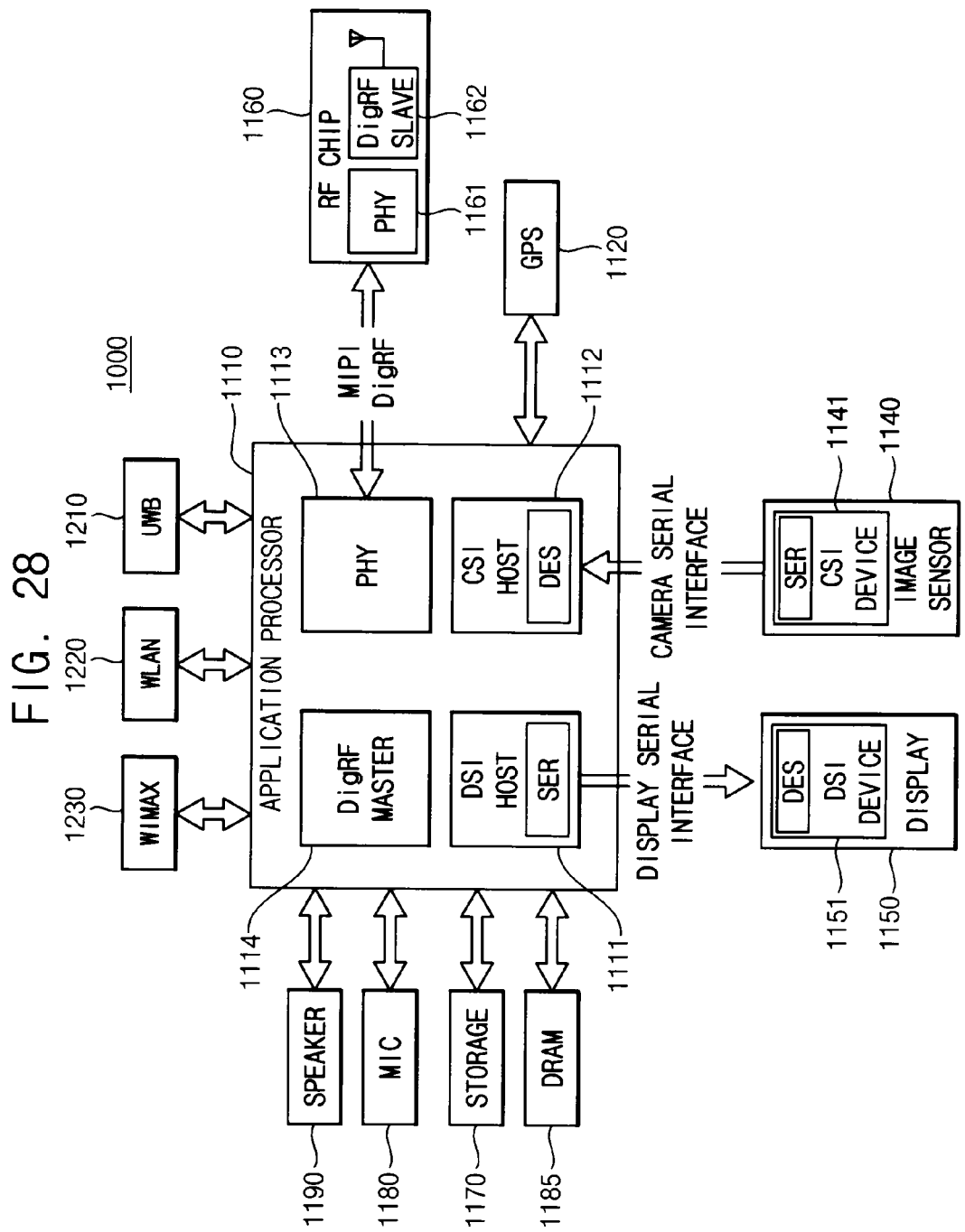
FIG. 28 is a block diagram illustrating a computing system employing interfacing system and/or method according to example embodiments.

FIG. 28 is a block diagram illustrating a computing system employing interfacing system and/or method according to example embodiments.

Referring to FIG. 28, a computing system 1000 may be implemented by a data processing device that uses or supports a mobile industry processor interface (MIPI) interface. The computing system 1000 may include an application processor 1110, an image sensor 1140, a display device 1150, etc. A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI).

In some embodiments, the DSI host 1111 may include a serializer (SER), and the DSI device 1151 may include a deserializer (DES). The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications of the PHY 1161.

The devices for the serial communication may further include elements in addition to the serializer SER and the deserializer DES for performing the interfacing method according to example embodiments. For example, the transmitting end may further include the bit stream generator to generate the frame signal and the receiving end may further include the path converter to perform the frame synchronization by the prompt multiplexing operation.

The at least some of the elements of the computing system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1120, a wireless local area network (WLAN) 1220, a worldwide interoperability for microwave access (WIMAX) 1130, etc. However, the structure and the interface of the electric device 1000 are not limited thereto.

Features and/or embodiments described herein may be applied to any device or system adopting the interface circuit for performing the serial communication according to example embodiments. For example, one or more embodiments may be applied to a computing system, such as a face recognition security system, a desktop computer, a laptop computer, a digital camera, a three-dimensional camera, a video camcorder, a cellular phone, a smart phone, a personal digital assistant (PDA), a scanner, a video phone, a digital television, a navigation system, an observation system, an auto-focus system, a tracking system, a motion capture system, an image-stabilizing system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An interface circuit, comprising:
    a deserializer including:
        a serial input terminal for receiving a serial signal, the serial signal including a frame start code; and
        a plurality of first output terminals for outputting a plurality of parallel signals based on the received serial signal, one of the plurality of parallel signals being a frame signal including the frame start code; and
    a frame detection circuit configured to detect the frame signal at one of the output terminals of the plurality of first output terminals, wherein
    the frame detection circuit includes a first detection unit configured to detect the frame signal first terminal of the plurality of first output terminals, and a second detection unit configured to detect the frame signal at a second terminal of the output terminals of the plurality of first output terminals,
    the first detection unit includes a first shift register configured to receive the frame signal output at the first terminal; and
    the second detection unit includes a second shift register configured to receive the frame signal output at the second terminal.

2. The interface circuit of claim 1, further comprising:
    a matching block circuit including a plurality of input terminals corresponding respectively to the plurality of first output terminals of the deserializer, and including a plurality of second output terminals, wherein the matching block circuit is configured to match the input terminals to the second output terminals based on the detection by the frame detection circuit.

3. The interface circuit of claim 1, wherein the frame start code of the serial signal is arranged as individual bits interleaved with data bits.

4. The interface circuit of claim 1, wherein: the first shift register is configured to compare a first frame start code of the received frame signal output at the first terminal to a first predetermined code; and the second shift register is configured to compare a second frame start code of the received frame signal output at the second terminal to a second predetermined code.

5. The interface circuit of claim 4, wherein:
    the first detection unit is configured to detect a frame signal at the first terminal when the first frame start code matches the first predetermined frame code; and
    the second detection unit is configured to detect a frame signal at the second terminal of the output terminal when the second frame start code matches the second predetermined frame code.

6. The interface circuit of claim 5, further comprising:
    a matching block circuit including a plurality of input terminals corresponding respectively to the plurality of first output terminals of the deserializer, including a plurality of second output terminals, and including at least one terminal for receiving a control signal from a detection control circuit that includes the frame detection circuit,
    wherein the control signal depends on at least one of a frame signal detected at the first terminal by the first detection unit, or a frame signal detected at the second terminal by the second detection unit, and
    wherein the matching block circuit is configured to match the input terminals to the second output terminals based on the control signal.

7. The interface circuit of claim 6, wherein each of the first and second detection units is configured to detect whether a signal received at that detection unit is the frame signal; and the frame detection circuit is configured to output the control signal when it is detected that a frame signal has been continuously periodically received at one of the first or second detection units.

8. The interface circuit of claim 1, wherein the interface circuit is a memory interface circuit connected to a memory device.

9. The interface circuit of claim 1, wherein the serial signal is an optical signal transferred through an optical transmission line.

10. A method comprising:
receiving, at a deserializer, a serial signal that includes a frame code interleaved with a plurality of data bits;
outputting from the deserializer a plurality of parallel signals, one of the plurality of parallel signals being a frame signal including the frame code, and the remainder of the parallel signals being parallel data signals, each parallel data signal including a set of data bits from the plurality of data bits;
detecting, by a detection circuit, the frame signal;
reorganizing the plurality of parallel signals based on the detection by the detection circuit;
receiving, by a path converter circuit, the parallel signals from the deserializer;
receiving, by the path converter circuit, a control signal from the detection circuit, the control signal based on the detecting of the frame signal;
reorganizing, at the path converter circuit, the plurality of parallel based signals, based on the parallel signals from the deserializer and the control signal; and
outputting the reorganized plurality of parallel signals.

11. The method of claim 10, wherein the plurality of parallel signals comprise k+1 parallel signals including k parallel data signals and 1 parallel frame signal, the method further comprising:
outputting the k+1 parallel signals from the deserializer over k+1 output terminals of the deserializer;
receiving the k+1 parallel signals at the path converter circuit over k+1 input terminals of the path converter circuit; and
outputting the reorganized plurality of parallel signals over k+1 output terminals of the path converter circuit.

12. The method of claim 10, further comprising:
detecting the frame signal by comparing the frame code to a stored code.

13. The method of claim 12, further comprising:
enabling the detection circuit to detect the frame signal by transmitting an enable signal to the detection circuit.

14. The method of claim 13, further comprising:
transmitting a plurality of enable signals to a plurality of respective sub-circuits of the detection circuit, in order to enable each sub-circuit to determine whether a frame signal is received at a terminal connected to the sub-circuit.

15. The method of claim 14, further comprising:
determining, by one of the sub-circuits, that the terminal connected to it has received the frame signal; and
disabling the remaining sub-circuits after the determination.

16. The method of claim 10, further comprising:
detecting, by each of a plurality of sub-circuits of the detection circuit, whether a signal received at the sub-circuit is the frame signal; and
when it is detected that the frame signal has been continuously periodically received at the sub-circuit, transmitting a control signal that controls the reorganizing of the plurality of parallel signals.

17. The method of claim 16, further comprising:
when it is detected that the frame signal has been continuously periodically received at the sub-circuit greater than a threshold number of times, transmitting the control signal that controls the reorganizing of the plurality of parallel signals.

18. The method of claim 16, further comprising:
when it is detected that the frame signal has been continuously periodically received at the sub-circuit, disabling the remaining sub-circuits of the plurality of sub-circuits.

19. A method of interfacing signals, comprising:
receiving a first serial signal including a first frame signal, wherein the first frame signal includes a frame code;
deserializing the received first serial signal to output a first set of first parallel signals;
detecting the frame code from among the first set of first parallel signal;
reorganizing output paths for the first set of first parallel y signals based on the detection result, and outputting the first set of first parallel signals over the reorganized output paths to output a first set of second parallel signals, and
serializing a first set of initial parallel signals including the first frame signal to form the first serial signal.

20. The method of claim 19, further comprising:
receiving the first frame signal from the first set of initial parallel signals at a dedicated input terminal of a serializer.

21. The method of claim 20, wherein the dedicated input terminal is a terminal dedicated to receiving frame signals.

22. The method of claim 21, further comprising:
receiving a second serial signal including a second frame signal, wherein the second frame signal includes the frame code;
deserializing the received second serial signal to output a second set of first parallel signals;
further detecting the frame code from among the second set of first parallel signals; and
further reorganizing output-paths for the second set of first parallel signals based on the further detection result, and outputting the second set of first parallel signals over the further reorganized output paths to output a second set of second parallel signals.

23. The method of claim 22, wherein:
one parallel signal of the first set of first parallel signals is the first frame signal, and one parallel signal of the second set of first parallel signals is the second frame signal, and further comprising:
receiving the second frame signal from a second set of initial parallel signals at the dedicated input terminal of the serializer;
outputting the one parallel signal of the first set of first parallel signals at a first intermediate terminal;
outputting the one parallel signal of the second set of first parallel signals at a second intermediate terminal different from the first intermediate terminal; and
based on the first reorganization of the first set of first parallel signals, outputting the one parallel signal of the first set of first parallel signals at a predetermined output terminal; and
based on the second reorganization of the second set of first parallel signals, outputting the one parallel signal of the second set of first parallel signals at the predetermined output terminal.

24. A memory system, comprising:
a serializer including:
a plurality of serializer input terminals including at least a first dedicated input terminal dedicated to receiving a frame signal that includes a frame code, and
a serializer output terminal configured to output serialized data including the frame code; and an interface circuit including at least an interface input terminal, a plurality of intermediate output terminals, and a plurality of interface output terminals, each of the plurality of intermediate output terminals having a data path connected to one of the plurality of interface output terminals, wherein the interface circuit is configured to change the data paths connecting the intermediate output terminals to the interface output terminals, wherein one of the interface output terminals is predetermined to receive the frame code received by the first dedicated input terminal, and wherein the interface circuit includes:

a deserializer connected between the interface input terminal and the plurality of intermediate output terminals;

a matching block connected between the plurality of intermediate output terminals and the plurality of interface output terminals; and a detection control circuit connected to the deserializer and the matching block, and configured to output a frame code detection result to the matching block.

25. The memory system of claim 24, wherein:
the matching block is configured to change the data paths based on the frame code detection result.

26. The memory system of claim 24, wherein:
the serializer is configured to output the serialized data including the frame code such that frame code bits from the frame code are separated by data bits to form the serialized data.

27. The memory system of claim 24, wherein the serializer output terminal and the interface input terminal are connected through an optical transmission line configured to transfer an optical signal including the serialized data.

* * * * *